(12) United States Patent
Bando

(10) Patent No.: US 6,405,295 B1
(45) Date of Patent: Jun. 11, 2002

(54) DATA STORAGE APPARATUS FOR EFFICIENT UTILIZATION OF LIMITED CYCLE MEMORY MATERIAL

(75) Inventor: Kazuhiko Bando, Tokyo (JP)

(73) Assignee: Oki Electric Industry, Co., Ltd. (JP)

( * ) Notice: Subject to any disclaimer, the term of this patent is extended or adjusted under 35 U.S.C. 154(b) by 0 days.

(21) Appl. No.: 09/390,770

(22) Filed: Sep. 7, 1999

(51) Int. Cl.$^7$ ............................ G06F 12/00; G06F 12/02

(52) U.S. Cl. ..................... 711/165; 711/103; 711/156; 711/203; 711/206; 711/209

(58) Field of Search ................................ 711/209, 156, 711/103, 165, 173, 153, 203, 206

(56) References Cited

U.S. PATENT DOCUMENTS 5,907,856 A * 5/1999 Estakhri et al. ............. 711/103
5,930,815 A * 7/1999 Estakhri et al. ............. 711/103

\* cited by examiner

*Primary Examiner*—Do Hyun Yoo
*Assistant Examiner*—Jasmine Song
(74) *Attorney, Agent, or Firm*—Venable; James Burdett

(57) ABSTRACT

In the semiconductor memory device relating to the present invention, the memory is divided into a plurality of blocks having a plurality of sectors and stores user data in units of sectors. When writing one sector of user data, the controller converts the logical block address to a physical block address using the address table. The controller selects one unused block and writes one sector of user data to this unused block. When user data are stored in this unused block, all data in this block are deleted before data are written thereto. Next, the controller reads data corresponding to other sectors from a block corresponding to the physical block address discussed above and copies this data in order to an unused block. When the writing ends, the control portion overwrites the address table so that the physical address of this unused block is assigned to the logical block address discussed above. In other words, in the semiconductor memory device relating to the present invention, a new storage location is selected from the unused blocks when user data are overwritten, data are written to one sector of this new storage location, and data in other sectors are copied from the old storage location. Consequently, a buffer for temporarily handling data which are not to be overwritten is unnecessary.

24 Claims, 22 Drawing Sheets

ADDRESS TABLE

FLAG TABLE

ADDRESS TABLE

ADDRESS SEARCH BLOCK TABLE

DELETED DATA BLOCK TABLE

NOT YET ASSIGNED LOGICAL ADDRESS BLOCK TABLE

FIRST ADDRESS TABLE

SECOND ADDRESS TABLE

ADDRESS SEARCH BLOCK TABLE

DELETED DATA BLOCK TABLE

NOT YET ASSIGNED LOGICAL
ADDRESS BLOCK TABLE

FIRST ADDRESS TABLE

SECOND ADDRESS TABLE

RESIDENT ADDRESS TABLE

ADDRESS SEARCH BLOCK TABLE

DELETED DATA BLOCK TABLE

NOT YET ASSIGNED LOGICAL ADDRESS BLOCK TABLE

SPLIT BLOCK ADDRESS TABLE

PRE-MOVE BLOCK TABLE

POST-MOVE BLOCK TABLE

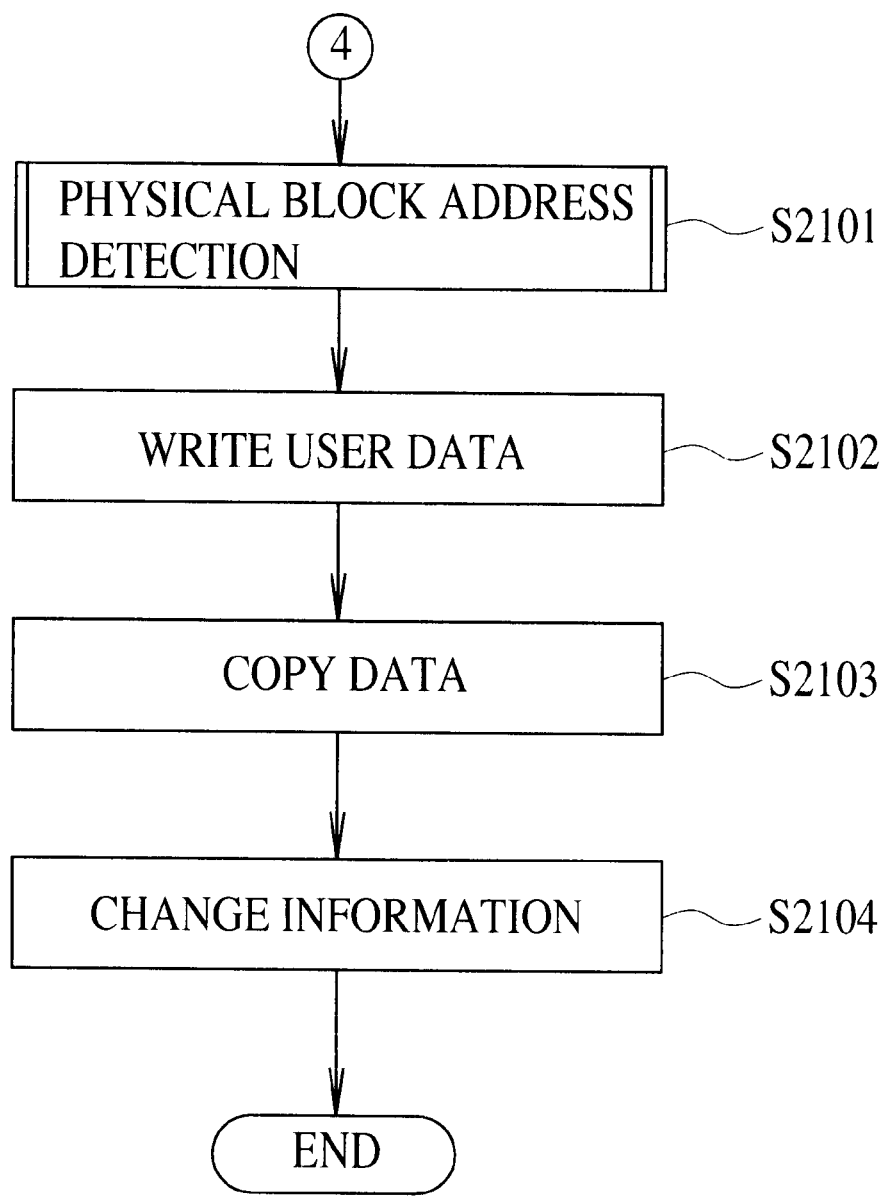

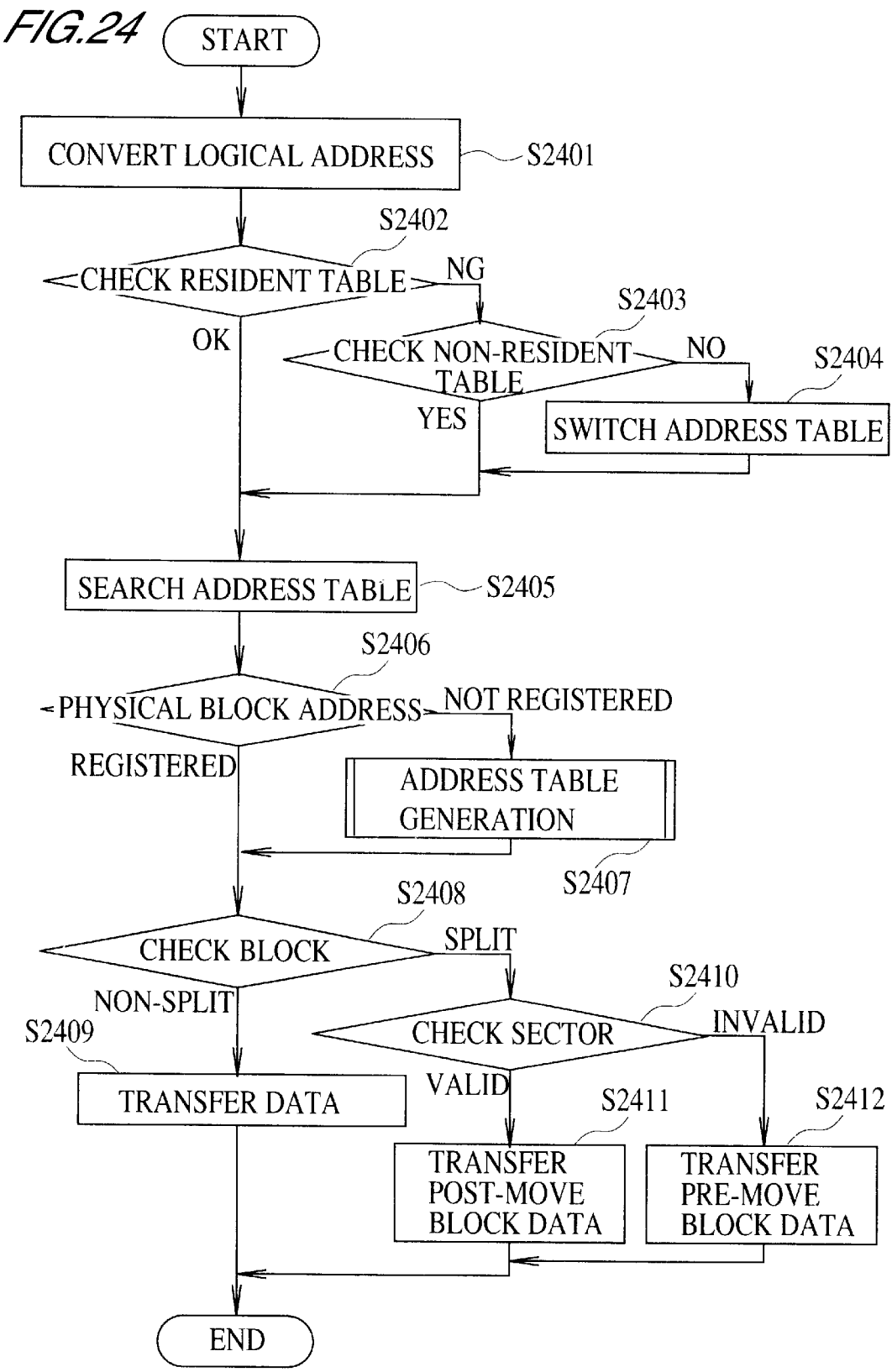

DATA STORAGE APPARATUS FOR EFFICIENT UTILIZATION OF LIMITED CYCLE MEMORY MATERIAL

BACKGROUND OF THE INVENTION

1. Field of the Invention

The present invention relates to a semiconductor memory device. The present invention relates more particularly to a semiconductor memory device using a system wherein, before data are overwritten, all data stored in a block containing the sector to be overwritten are deleted.

2. Description of the Related Art

Non-volatile semiconductor memory devices include devices using a system wherein data are overwritten by deleting previously stored data, then writing new data. Flash memory is an example of this type of memory device. Flash memory uses FAT (Floating gate Avalanche injection Transistors) as storage elements. In FAT, for example, the state where charge accumulates in the floating gate is defined as "0" and the state where charge does not accumulate in the floating gate is defined as "1." When defined in this way, it is possible to overwrite a "0" when "1" is stored in the storage element, but not to overwrite a "1" when "0" is stored. Consequently, data are written after the stored data are deleted in semiconductor memory devices using this type of storage element.

Also, these semiconductor memory devices include devices using a control system wherein the storage region is divided into a plurality of blocks and each block is divided into a plurality of sectors. One block comprises 16 sectors, for example. A memory device with this system writes and reads data in units of sectors, but deletes data in units of blocks.

When both these systems are employed, the memory device must delete an entire block of data, even when writing only one sector of data. In this write operation, data stored in other sectors of that block are transferred once to buffer memory and stored there temporarily. After the data of that block are deleted, these stored data are rewritten to the original block along with the one sector of new data.

Because data are deleted in units of blocks, these semiconductor devices have the advantage that data deletion can be controlled with small scale circuitry, but the disadvantage of requiring a large capacity buffer memory.

SUMMARY OF THE INVENTION

It is an object of the present invention to provide a semiconductor memory device that deletes data in units of blocks, but does not require a large capacity buffer memory.

For this reason, the semiconductor memory device relating to the present invention comprises: memory means divided into a plurality of blocks, each comprising a plurality of sectors, for storing user data in units of sectors; control means for writing the user data to a sector of an unused block and copying the user data stored in not-rewriting sector of the used block to the other sectors of the unused block, when rewriting user data stored in the sector of the used block.

When rewriting data, a semiconductor memory device relating to the present invention selects a new storage block from an unused block and writes data to a sector of this new storage block. Consequently, a buffer for temporarily handling data which are not to be overwritten is not necessary. Data in other sectors are copied to the new storage block from the old storage block.

BRIEF DESCRIPTION OF THE DRAWINGS

Other objects and advantages of the present invention are explained with reference to the attached drawings.

FIGS. 18 to 24 are flow charts for explaining the operations of the fifth embodiment.

DESCRIPTION OF THE PREFERRED EMBODIMENTS

Figure 1:
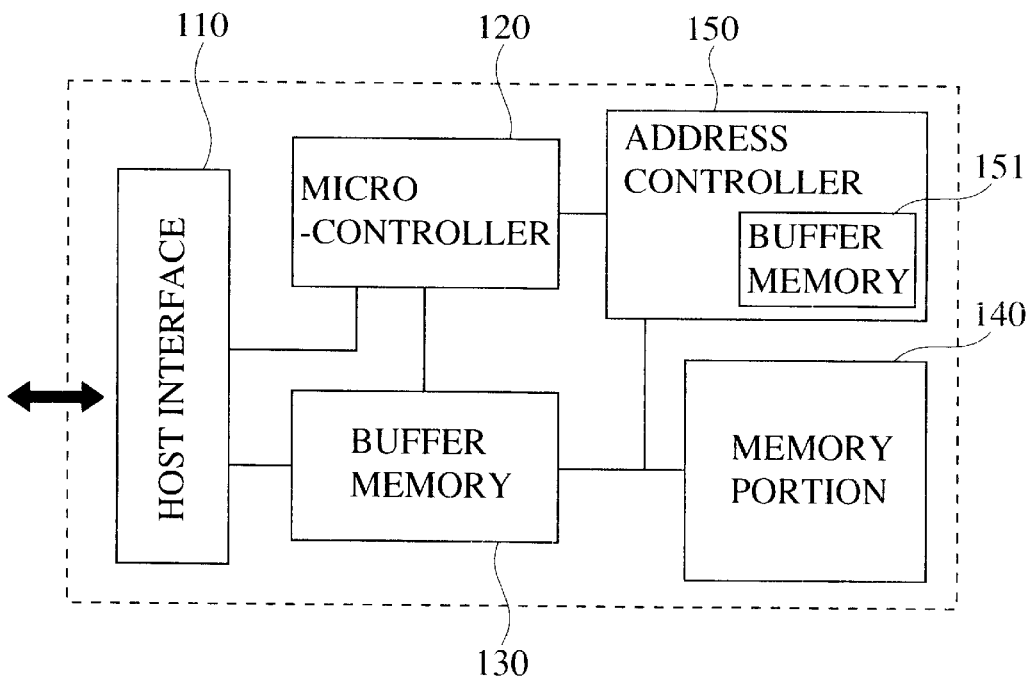
FIG. 1 is a block diagram showing the general circuit configuration of the semiconductor memory device relating to the present invention.

The preferred embodiments of the present invention are explained below using the drawings. In the drawings, the sizes and shapes of and physical relationships among the component elements serve only to explain the present invention; the numerical conditions in the following explanations are merely illustrative.

First Embodiment

Figure 2:
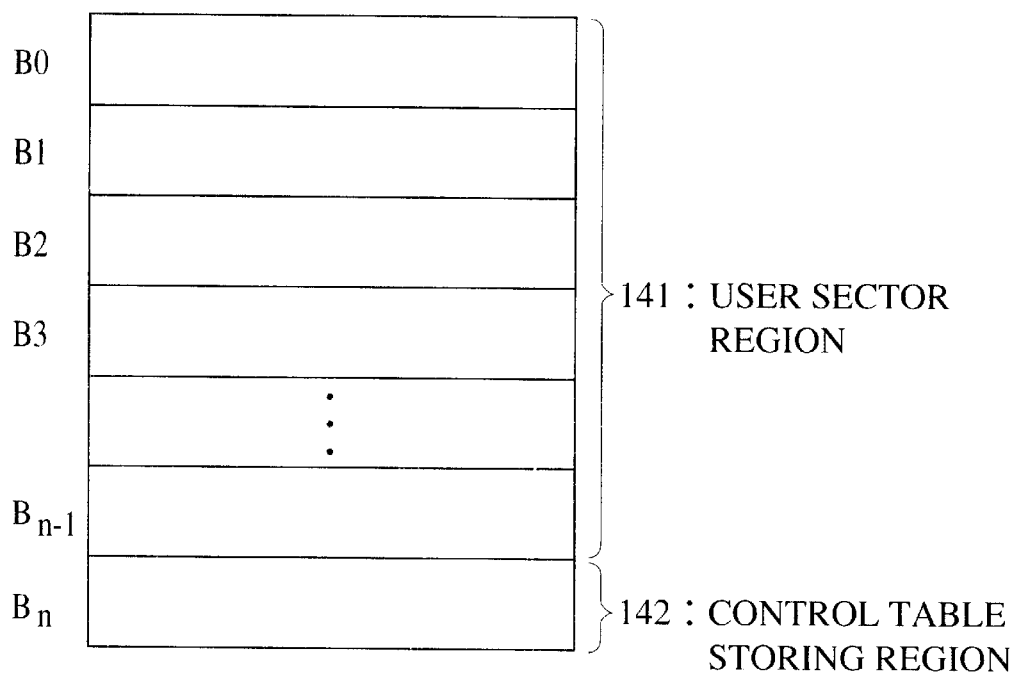
FIG. 2 is a conceptual diagram showing the constitution of the memory portion of the first embodiment.

The first embodiment relating to the present invention is explained using FIGS. 1 to 3.

FIG. 1 is a block diagram showing the constitution of the semiconductor memory device relating to the first embodiment of the present invention.

As shown in FIG. 1, the semiconductor memory device relating to the present embodiment comprises a host interface 110, microcontroller 120, buffer memory 130, memory portion 140 and address controller 150. The address controller 150 comprises a buffer memory 151.

The host interface 110 is an interface for receiving logical addresses and sending and receiving user data between the semiconductor memory device and the host, which is not shown.

The microcontroller 120 converts the logical address input from the host interface 110 to a logical block address and sector address and then sends the addresses to the address controller 150. The microcontroller 120 controls the writing, reading, and deletion of data in the memory portion 140.

The buffer memory 130 temporarily holds data written to the memory portion 140 and data read from the memory portion 140. Volatile semiconductor memory, for example, may be used as the buffer memory 130.

The address controller 150 converts the logical block address and physical block address as discussed below by using the address table and flag table stored in buffer memory 151. Volatile semiconductor memory, for example, may be used as the buffer memory 151.

The memory portion 140 is used mainly for storing user data. In the present embodiment, a type of memory for writing new data after deleting stored data is used as the memory portion 140. For example, flash memory is this type of memory.

FIG. 2 shows the constitution of the memory portion 140.

As shown in FIG. 2, the storage region of the memory portion 140 is divided into n+1 blocks, $B_0$ to $B_n$. Each block comprises a plurality of sectors. For example, there are 16 sectors in a block. The blocks $B_0$ to $B_n$ are specified with physical block addresses. Each sector is specified with a physical block address and sector address.

The user sector region 141 has n blocks, $B_0$ to $B_{n-1}$. Specifically, these blocks $B_0$ to $B_{n-1}$ are used to store user data input from the host.

The control table storing region 142 has one block $B_n$. The block $B_n$ is used for storing the control tables, specifically the address table and flag table. As discussed above, these tables are transferred to the buffer memory 151 in the case of writing, reading, or deleting data in the user sector region 141.

The memory portion 140 writes and reads data in units of sectors. The memory portion 140 deletes data in units of blocks.

Figure 3A:
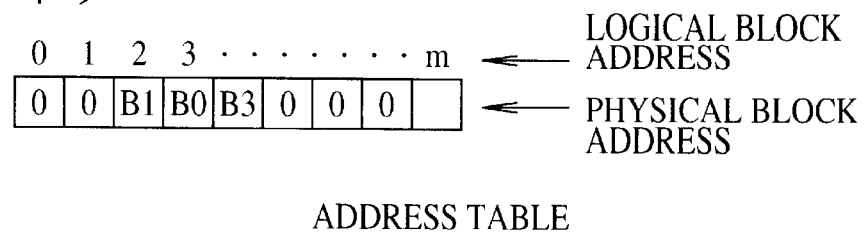
FIG. 3 is a conceptual diagram showing the control tables used in the first embodiment.
Figure 3B:
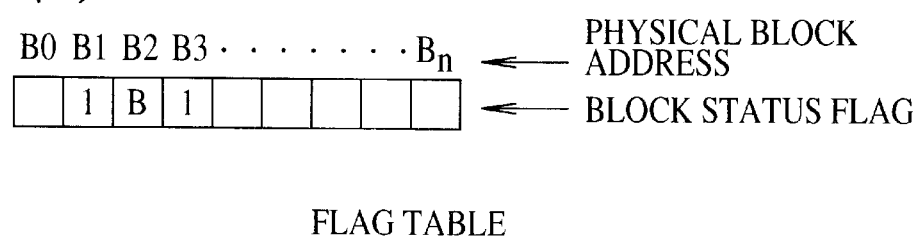

FIG. 3(A) shows a conceptual diagram of the address table; FIG. 3(B) shows a conceptual diagram of the flag table.

As shown in FIG. 3(A), the address table shows the relationship between the logical block address and the physical block address.

The present invention uses two concepts for "address." One is the logical address and the other is the physical address. The logical address is input from the host of the semiconductor memory device as the write address or read address. The logical address comprises a logical block address and sector address. The logical block address specifies a block. The sector address specifies a sector within the block specified by the logical block address. On the other hand, the physical address is an actual address in the memory portion 140. The physical block address physically specifies any one of the blocks $B_0$ to $B_n$ in the memory portion 140. A sector in the block specified by the physical block address is specified with the sector address. As discussed above, the logical block address and physical block address are converted back and forth using the address table. In the present invention, the sector address is not converted.

The flag table stores flags showing the status of the blocks $B_0$ to $B_{n-1}$ in the user sector region 141. The flag table uses the physical block address as an address to specify a block. Used blocks and unused blocks are present within the user sector region 141. The used blocks are blocks which are assigned a logical block address and that contain user data. The unused blocks are blocks that are not assigned a logical block address. The unused blocks include those that do and do not contain user data. Blocks that do not contain user data include blocks in which user data have not yet been stored, and blocks in which user data were stored but have been deleted. Blocks containing user data are blocks that are unused, but from which previously stored user data are not yet deleted. The flag table comprises flags for distinguishing among used blocks, unused blocks that do not contain data, and unused blocks that do contain data.

The operations of the semiconductor memory device relating to the present embodiment are explained next.

The operation of writing user data to the semiconductor memory device is explained first. The write operation is different for the case of writing user data for the first time to a given logical address, and for the case of replacing user data in a given logical address.

The operation for writing user data for the first time to a given logical address is performed as follows.

First the microcontroller 120 reads the address table and flag table from the control table storing region 142 of the memory portion 140 and stores these tables in the buffer memory 151 in the address controller 150.

After that, the semiconductor memory device inputs the logical address and control signal from the host. The logical address and control signal are input to the microcontroller 120 via the host interface 110.

The microcontroller 120 converts the logical address to the logical block address and sector address, and outputs the addresses to the address controller 150.

The address controller 150 searches for the physical block address corresponding to the logical address using the address table. In this example of the operations, the physical block address corresponding to this logical block address is not present because user data are being written for the first time to the logical address. Consequently, information to the effect that the corresponding physical block address is not present is stored in the field for this logical block address in the address table.

In this case, the address controller 150 searches for an unused block using the flag table. Specifically, the address controller 150 serially checks the flags stored in the flag table to search for unused blocks that do not contain data and for unused blocks that do contain data. One physical block address is selected in this search. Unused blocks that do not contain data are preferentially selected when both unused blocks that do not contain data and unused blocks that do contain data are present. Unused blocks that do not contain data are preferable because it is not necessary to delete data before writing user data; this results in shorter times required for the write operation.

When the selected physical block address is the address of an unused block that contains data, the microcontroller 120 deletes all data contained within that block. Next, user data are stored temporarily in the buffer memory 130 via the host interface 110. User data stored in the buffer memory 130 are then written to the sector specified with the selected physical block address and sector address. On the other hand, when the selected physical block address is the address of an unused block that does not contain data, the microcontroller 120 does not delete data, but stores user data in the buffer memory 130 and writes this user data to the sector.

The address controller 150 then updates the address table and flag table in the buffer memory 151. In updating the address table, the address controller writes the selected physical block address to the field for the logical block address input from the host. In updating the flag table, the address controller stores a flag indicating a used block in the field of the selected physical block address.

Finally, the microcontroller 120 reads the address table and flag table from the buffer memory 151 in the address controller 150 and deletes data in the control table region 142 in the memory portion 140 and stores these tables in it.

The operation for overwriting user data is performed as follows.

The microcontroller 120 converts the logical address to the logical block address and sector address, and outputs the addresses to the address controller 150.

Next, the logical address and control signal are input to the microcontroller 120 via the host interface 110.

The microcontroller 120 converts the logical address to the logical block address and sector address and outputs the addresses to the address controller 150.

The address controller 150 searches for the physical block address corresponding to the logical block address using the address table. In this example, the physical block address corresponding to this logical block address is present because user data are already written to this logical block address. Consequently, the physical block address is stored in the field of the logical block address in the address table. Specifically, the address controller 150 recognizes, with the address table, that valid data are stored in the block corresponding to this logical block address.

Next the address controller 150 searches for a block to be the new storage location for the user data stored in this block. In this search, the address controller 150 serially checks the flags stored in the flag table to search for unused blocks that do not contain data, and for unused blocks that do contain data. Through this search, one physical block address is selected to be the new storage location. Unused blocks that do not contain data are preferentially selected when both unused blocks that do not contain data and unused blocks that do contain data are present. Unused blocks that do not contain data are preferable because it is not necessary to delete data before writing user data; this results in shorter times required for the write operation.

When the new storage location is an unused block that does contain data, the microcontroller 120 deletes all the data stored in that block. Next the microcontroller 120 stores user data input via the host interface 110 in the buffer memory 130. The user data stored in the buffer memory 130 are then written to the sector of the new storage location. This sector is specified with the sector address in the logical address input from the host. On the other hand, when the new storage location is an unused block that does not contain data, the microcontroller 120 does not delete data, but stores user data in the buffer memory 130, and writes this user data to the sector.

Next the microcontroller 120 copies data for sectors other than the new storage location, specifically sectors other than sectors to which user data from the host are written. In this copy operation, one sector of data are read from the old storage location, specifically a block corresponding to the logical block address. Then these data are written to a sector in the new storage location. The same sector address as used during the read operation is used as the sector address during the write operation. This copy operation is carried out for all sectors, excluding the sector to which user data from the host were written. Block data overwritten by only one sector of the old storage location data are thereby stored to the new storage location.

Then the address controller 150 updates the address table and flag table in the buffer memory 151. In updating the address table, the address controller 150 writes the physical block address of the new storage location to the field of the logical block address input from the host. In updating the flag table, the address controller 150 stores a flag indicating a used block in the field for the physical block address corresponding to the new storage location, and then stores a flag indicating an unused block that contains data in the field for the physical block address corresponding to the old storage location.

Finally, the microcontroller 120 reads the address table and flag table from the buffer memory 151 in the address controller 150, and deletes data in the control table region 142 in the memory portion 140, and stores these tables in it.

The operation for reading user data from the semiconductor memory device is explained next.

The microcontroller 120 reads the address table and flag table from the control table storing region 142 in the memory portion 140, and stores these tables in the buffer memory 151 of the address controller 150.

Next, the logical address and control signal are input to the microcontroller 120 via the host interface 110.

The microcontroller 120 converts the logical address to a logical block address and sector address, and outputs the addresses to the address controller 150.

The address controller 150 searches for the physical block address corresponding to the logical block address using the address table.

Under the control of the microcontroller 120, the user data corresponding to this physical block address and sector address are read from the memory portion 140 and stored in the buffer memory 130.

Finally, under the control of the microcontroller 120, user data stored in the buffer memory 130 are output to the host via the host interface 110.

As explained above, when overwriting sector data in a block, the semiconductor memory device relating to the present embodiment copies all data in the block to another block. Consequently, the buffer memory 130 needs to have only the capacity to store one sector of data. In other words, a small scale buffer memory 130 can be achieved with the present embodiment.

Additionally, the semiconductor memory device relating to the present embodiment uses a separate address from the address used by the host in writing and reading data from the memory portion 140 and manages the relationship between the addresses with the address table. Consequently, it is not necessary to change the address used by the host even when copying all data in a block to another block. Specifically, the present embodiment does not invite complex host control.

Second Embodiment

The second embodiment of the present invention is explained using FIGS. 4 to 10.

The circuit configuration of the semiconductor memory device relating to the present embodiment is the same as FIG. 1 and an explanation thereof is omitted.

Figure 4:
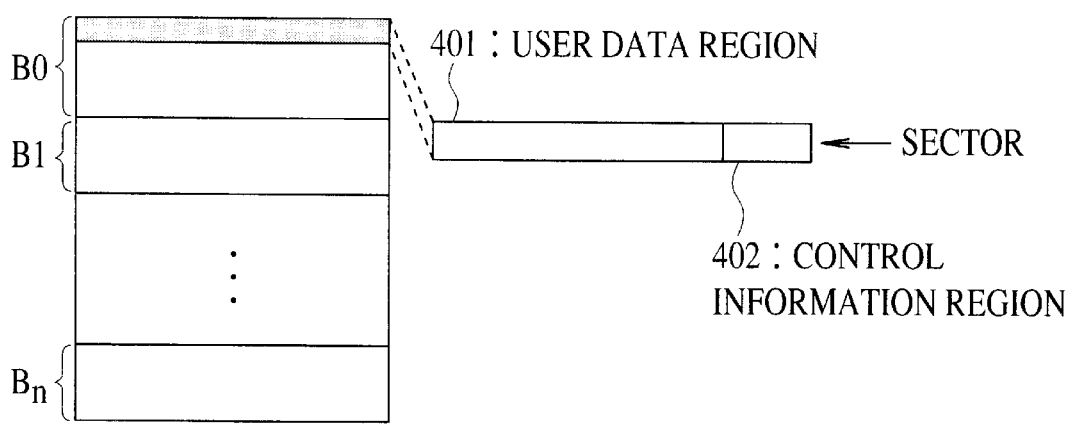
FIG. 4 is a conceptual diagram showing the constitution of the memory portion of the second, third, fourth, and fifth embodiments.
Figure 5A:
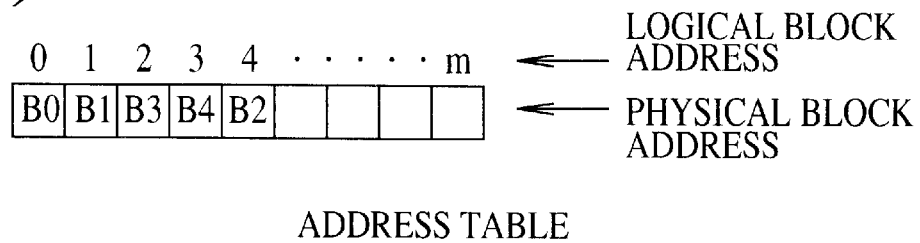
FIG. 5 is a conceptual diagram showing the control tables used in the second embodiment.
Figure 5B:
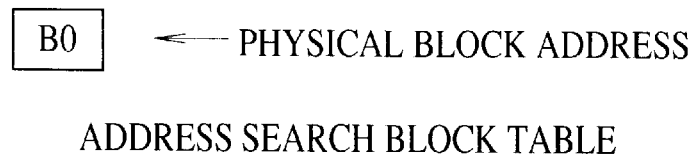
Figure 5C:
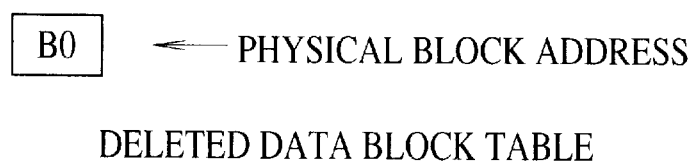
Figure 5D:
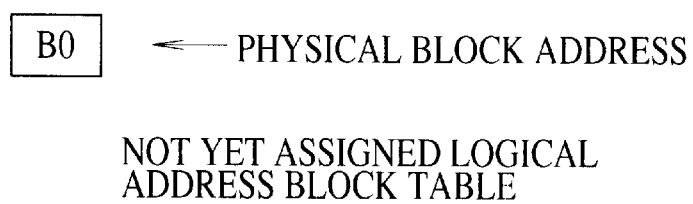

FIG. 4 is a conceptual diagram showing the constitution of the memory portion 140.

As shown in FIG. 4, the memory region of the memory portion 140 is divided into n+1 blocks, $B_0$ to $B_n$. For example, each block comprises 16 sectors. The blocks $B_0$ to $B_n$ are specified with physical block addresses. Each sector is specified with a physical block address and sector address.

Each sector has a user data region 401 and a control information region 402. The user data region 401 is used to store user data input from the host. The control information region 402 of the leading sector in each block stores information such as the logical block address assigned to that block, and the status of that block. The control information regions 402 of other sectors are not used.

Data are read and written to the memory portion 140 in units of sectors. Meanwhile, data are deleted from the memory portion 140 in units of blocks.

FIG. 5 shows the constitution of the control tables. (A) shows the address table, (B) shows the address search block table, (C) shows the deleted data block table, and (D) shows the not yet assigned logical address block table.

The address table shows the relationship between the logical block addresses and physical block addresses. The address search block table shows the physical block address at which the search to generate the address table begins. The deleted data block table shows the leading physical block address in physical block addresses which correspond to blocks that do not contain data. The not yet assigned logical address block table shows the leading physical block address in physical block addresses which correspond to blocks that contain data and are not assigned logical block addresses.

In the present embodiment, the control tables are stored in the buffer memory 151 in the address controller 150, and are not held in the memory portion 140. This aspect is different from the first embodiment wherein control tables are held in the memory portion 140 and stored in the buffer memory 151 only when used. As discussed above, the memory portion 140 in the present embodiment holds only user data and information relating to the logical block addresses assigned to blocks, and so forth.

Figure 6:
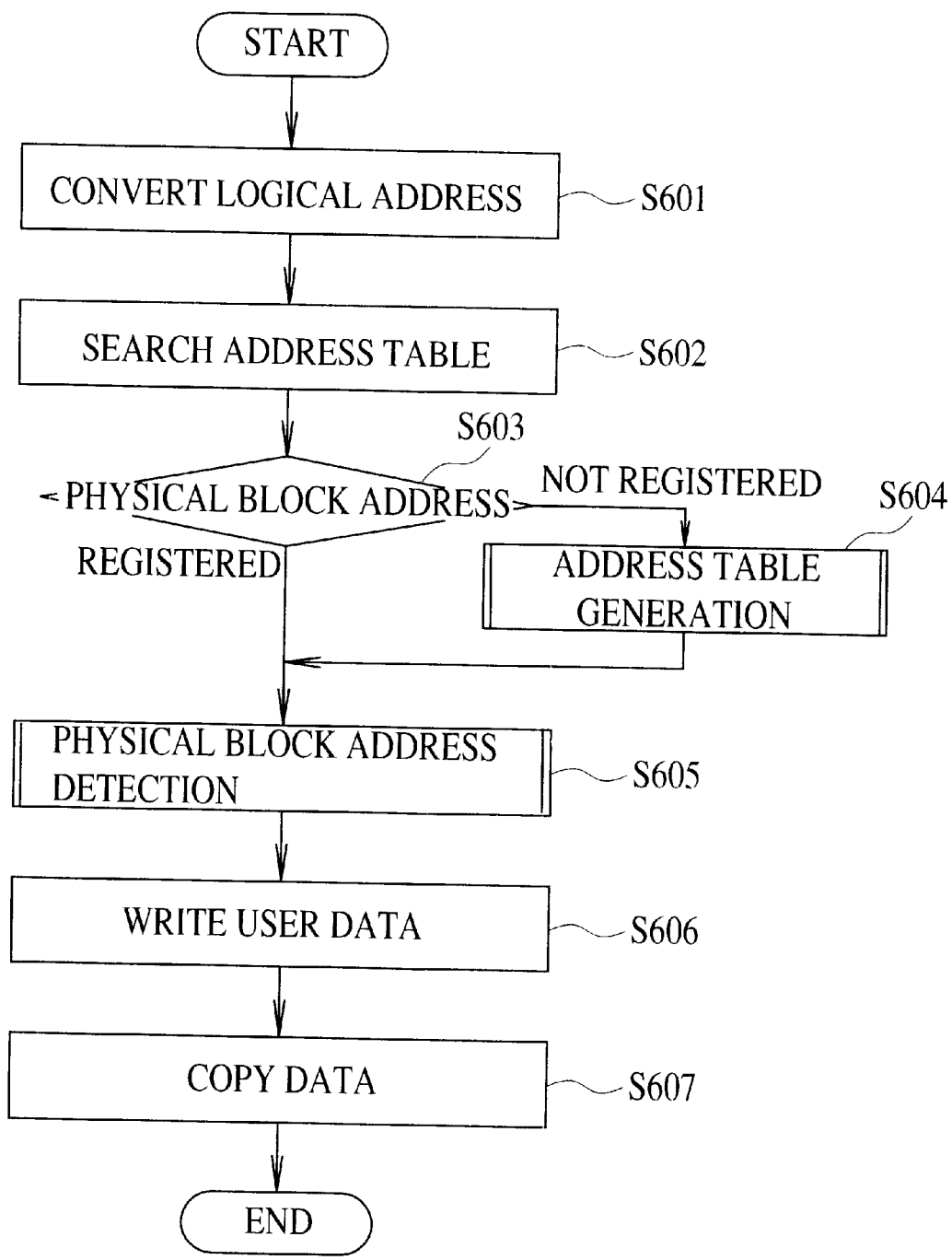
FIGS. 6 to 10 are flow charts for explaining the operations of the second embodiment.
Figure 7:
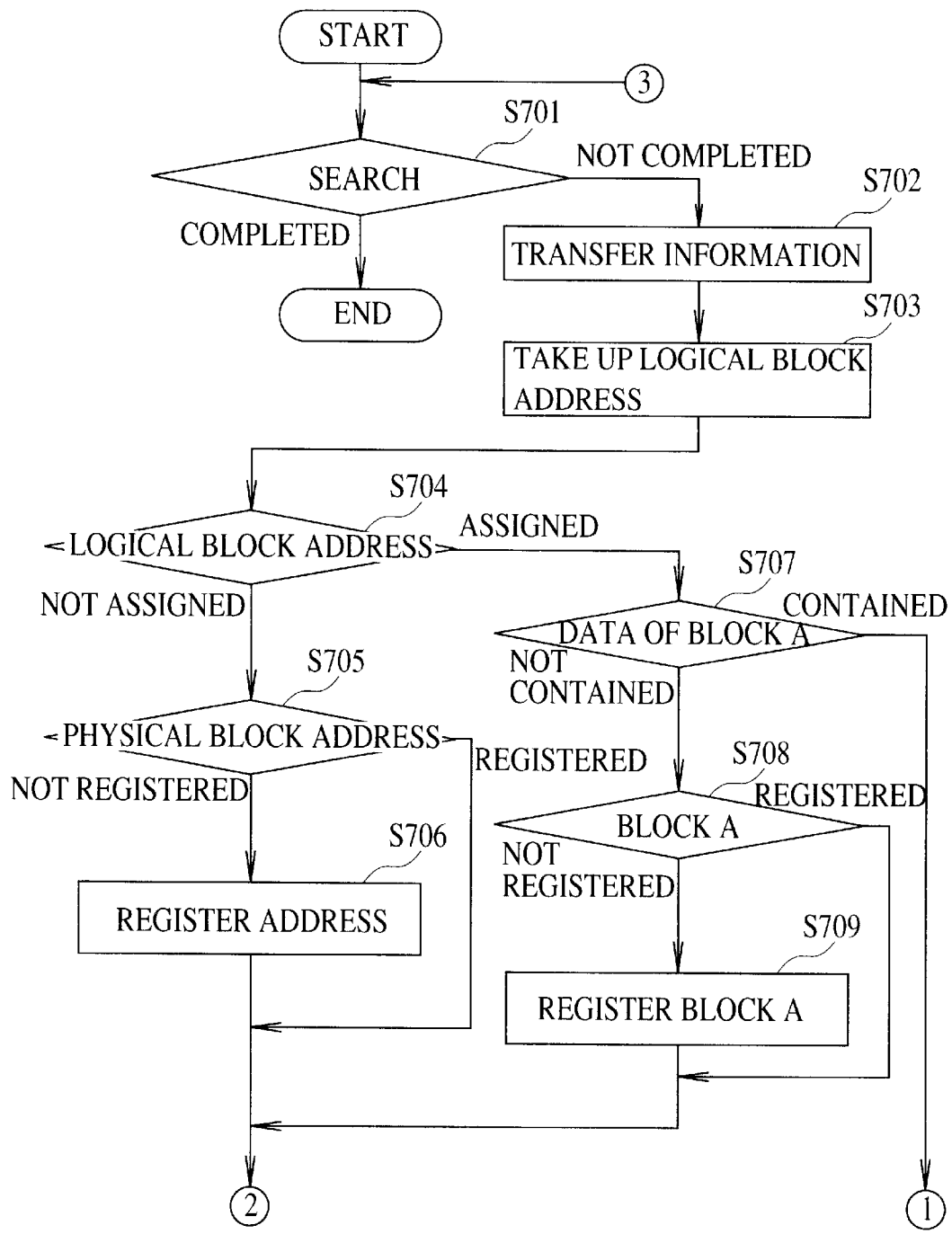
Figure 8:
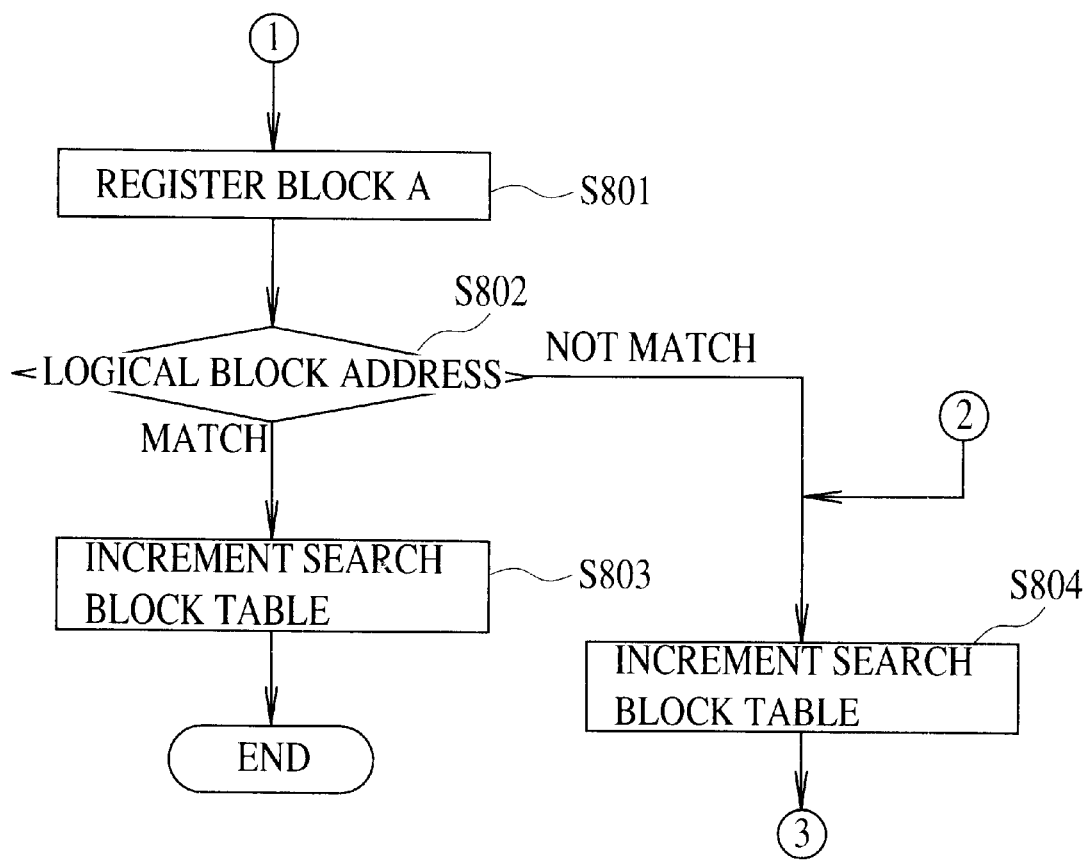
Figure 9:
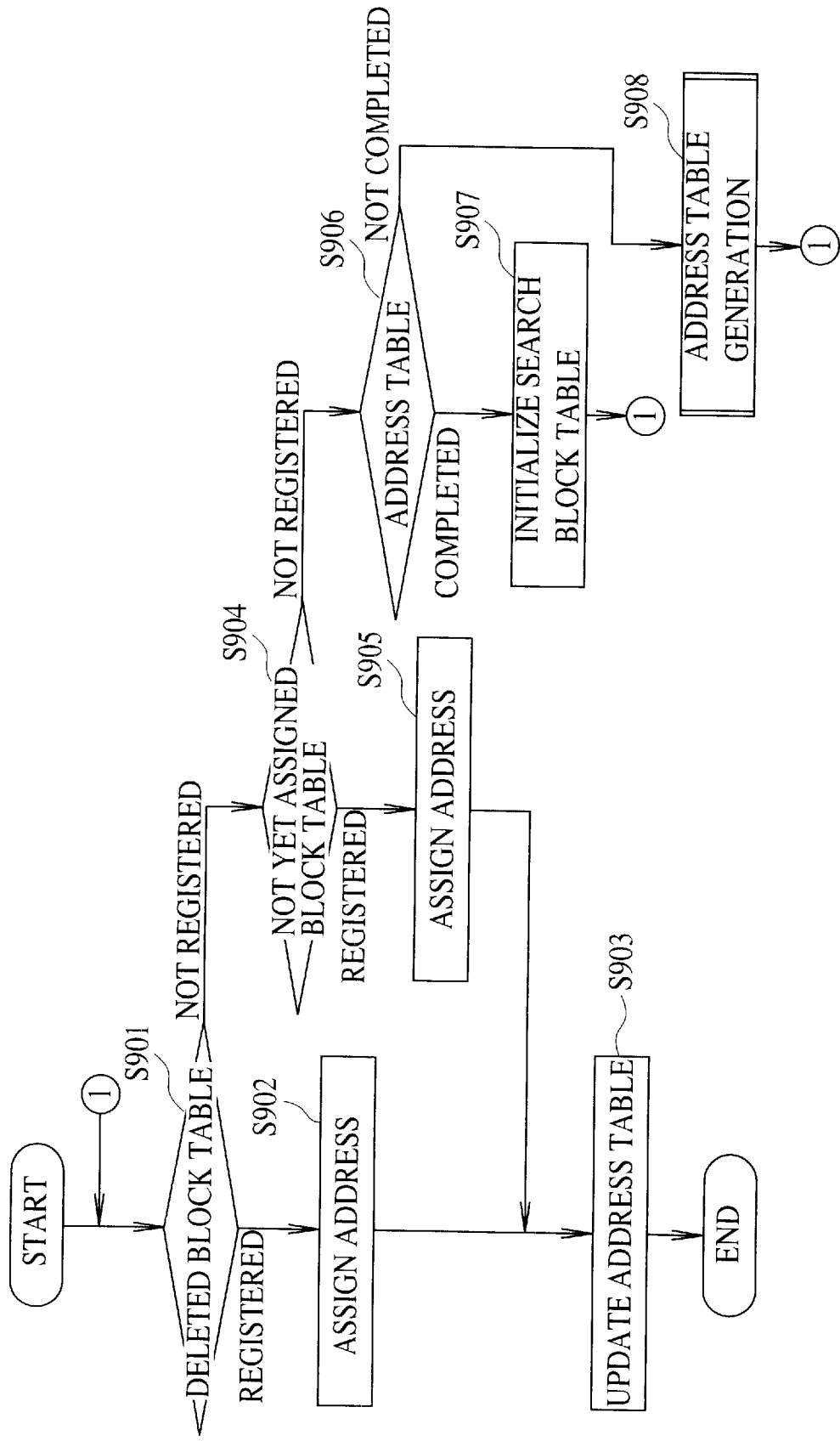

Next, the operations for writing user data to the semiconductor memory device relating to the present embodiment are explained using FIGS. 6 to 9. FIG. 6 shows a flow chart of the total process while FIGS. 7 to 9 show flow charts of subroutines.

When the semiconductor memory device is started up, the control tables in the buffer memory 151 are initialized. In this initialization operation, information to the effect that a matching physical block address is not present is written to the entire address table, the deleted data block table, and the not yet assigned logical address block table. Additionally, the physical block address of the leading block $B_0$ of the memory portion 140 is written to the address search block table.

The semiconductor memory device inputs the logical address and control signal from the host. The logical address and control signal are input to the microcontroller 120 via the host interface 110.

The microcontroller 120 converts this logical address to a logical block address and sector address and sends these addresses to the address controller 150 (see S601 in FIG. 6).

The microcontroller 120 searches for the physical block address corresponding to the logical block address using the address table (S602). Then the microcontroller 120 determines whether the physical block address corresponding to the logical block address is registered (S603). When the physical block address corresponding to the logical block address is registered, the processes from step S605 onward are executed. On the other hand, if the physical block address corresponding to the logical block address is not registered, the address table is generated by the execution of the subroutine in step S604.

The address table is generated as follows (see FIG. 7).

The physical block address stored in the address search table is compared with the physical block address of the final physical block address in the memory portion 140 (S701). When the stored physical block address has a value greater than or equal to the final physical block address, generation of the address table is determined to be complete and the subroutine terminates.

On the other hand, when the value of the stored physical block address is less than the value of the final physical block address, the generation of the address table is determined to be incomplete. Information stored in the control information region 402 of the leading sector of the block indicated by the stored physical block address is read and stored in the buffer memory 151 (S702). In the following explanation, the block indicated by the stored physical block address is referred to as "block A."

The microcontroller 120 takes up information relating to the status of block A from the control information region 402 stored in the buffer memory 151. "Status" means any of the following: the status wherein the block contains data and is assigned a logical block address; the status wherein the block does not contain data and is not assigned a logical block address; and the status wherein the block does contain data and is not assigned a logical block address.

When the block A has the status where the block contains data and is assigned a logical block address, in other words, when block A is in a used state, the microcontroller 120 takes up the logical block address of the block A from the control information region 402 (S703).

Next, the microcontroller 120 determines whether a logical block address is assigned to the block A using the information taken from the control information region 402 (S704). When a logical block address is not assigned to the block A, the microcontroller 120 then determines whether the physical block address of some blocks is registered in the not yet assigned block table (S705). When the physical block address of the block A is registered, the microcontroller 120 executes the processes from step S804 onwards. Meanwhile, when the physical block address of the block A is not registered, the microcontroller 120 registers the physical block address of the block A in the not yet assigned block table (S706) and executes the processes from step S804 onwards.

When it is determined in step S704 that a logical address is assigned to the block A, the microcontroller 120 determines whether the block A contains data using information taken from the control information region 402 (S707). When the block A does not contain data, the microcontroller 120 then determines whether the physical block address of some blocks is registered in the deleted block table (S708). When the physical block address is registered, the microcontroller 120 executes the processes from step S804 onwards. Meanwhile, when the physical block address is not registered, the microcontroller 120 registers the physical block address of the block A in the deleted block table (S709), and executes the processes from step S804 onwards.

When it is determined in S707 that the block A contains data, the block A is a block with an assigned logical block address. The microcontroller registers the physical block address of the block A in the field for this logical block address in the address table (S801).

Next, the microcontroller 120 compares this logical block address to the logical address input from the host (S802). When the addresses match, the microcontroller 120 updates the physical block address registered in the search block table by incrementing the physical block address (S803) and ends the subroutine. Meanwhile, when the addresses do not match in step S802, the processes from step S804 onwards are executed.

In step S804, the microcontroller 120 updates the physical block address registered in the search block table by incrementing the physical block address (S804), then executes the processes from step S701 onwards for the next physical block address.

When the address table generation subroutine ends, the microcontroller 120 then executes the processes from step S605 onwards.

In step S605, a subroutine for detecting a physical block address newly assigned to a logical address is executed.

This subroutine executes the following processes (see FIG. 9).

It is determined whether the physical block address of some blocks is registered in the deleted block table (S901). If registered, this physical block address is assigned to the logical block address input from the host (S902). The microcontroller 120 registers the new relationship of the logical block address and physical block address by updating the address table (S903) and ends this subroutine.

When the physical block address of some blocks is not registered in the not yet assigned block table in step S904, it is then determined whether the generation of the address table is complete (S906). In this determination, the physical block address stored in the address search table is compared with the physical block address of the final block in the memory portion 140. It is determined that generation of the address table is complete when the stored physical block address value is greater than or equal to the final physical address value. In this case, the microcontroller 120 initializes the search block table by registering the leading block address in the memory portion 140 (S907), and then executes the processes from step S901 onwards.

When the physical block address of some blocks is not registered in the not yet assigned block table in step S904, it is then determined whether the generation of the address table is complete (S906). In this determination, the physical block address stored in the address search table is compared with the physical block address of the final block in the memory portion 140. It is determined that generation of the address table is complete when the stored physical block address value is greater than or equal to the final physical address value. In this case, the microcontroller 120 initializes the search block table by registering the leading block address in the memory portion 140 (S907) and then executes the processes from step S901 onwards.

Meanwhile, when the stored physical block address value is less than the final physical address value, it is determined that the preparation of the address table is not complete. In this case, the microcontroller 120 executes the address table generation subroutine shown in FIGS. 7 and 8 (S908), then executes the processes from step S901 onwards.

Once the physical block address detection subroutine is ended, the microcontroller 120 writes user data input from the host to the memory portion 140 (S606). In this write operation, when data are stored in the block that is the new storage location, those data are deleted. The user data are stored once in the buffer memory 130, then written to the user data region 401 of the sector specified with this physical block address and sector address. Moreover, when this sector is the leading sector in a block, the logical block address corresponding to this block is written to the control information region 402 at the same time the user data are written.

Next, the microcontroller copies data to other sectors of the new storage location, specifically to those sectors other than the sector to which user data from the host are written (S607). In this copy operation, one sector of data is read from the user data region 401 of the sectors in the old storage location and is written to the user data region 401 of the sectors in the new storage location. The same sector address as is used at the time of reading is used at the time of the writing operation. Moreover, when this sector is the leading sector of the block, the logical block address corresponding to this block is written to the control information region 402 at the same time user data are written. This copy operation is carried out for all sectors excluding the sector to which user data from the host are written. Block data replacing part of sectors of data from the old storage location are thereby stored in the new storage location.

Next, the microcontroller 120 writes information to the effect that the logical address is not assigned to the control information region 402 of the leading sector of the old storage location. When FAT is used as the storage element, as discussed above, data deletion is not necessary except when 0 overwrites 1. Consequently, if the information to the effect that the logical address is assigned is expressed with 1 and the information to the effect that the logical address is not assigned is expressed with 0, then the microcontroller 120 can overwrite the control information without deleting the data in the old storage location.

Figure 10:
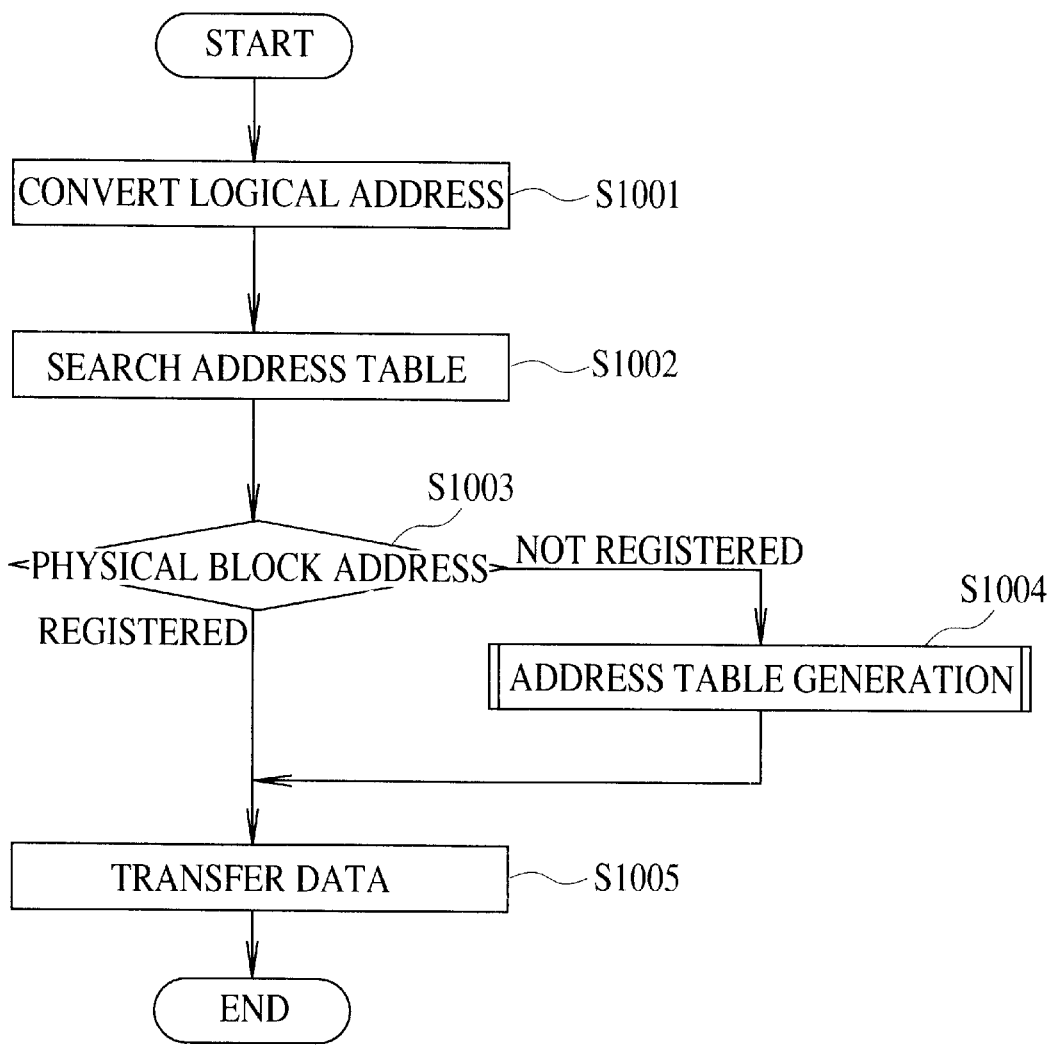
Figure 11A:
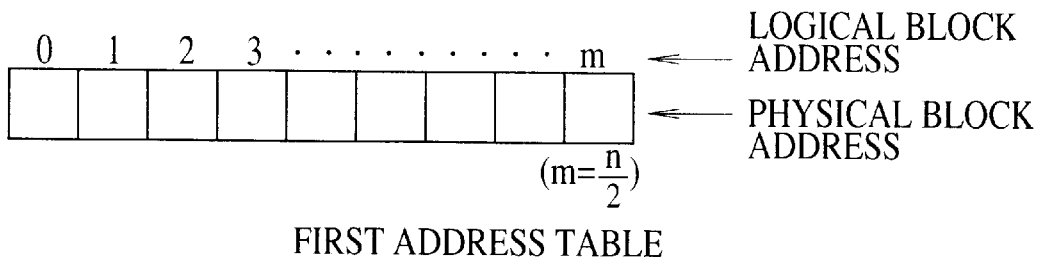
FIG. 11 is a conceptual diagram showing the control tables used in the third embodiment.
Figure 11B:
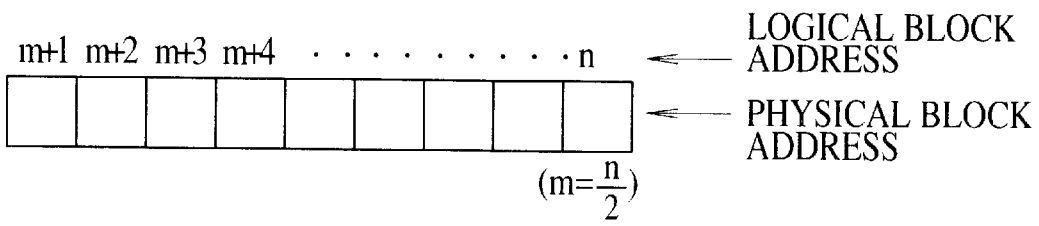
Figure 11C:
Figure 11D:
Figure 11E:

Next, the operation for reading user data from the semiconductor memory device is explained using FIG. 10.

The logical address and control signal are input to the microcontroller 120 via the host interface 110.

The microcontroller 120 converts the logical address to a logical block address and sector address (S1001).

The microcontroller 120 searches for the physical block address corresponding to the logical address using the address table (S1002). The microcontroller 120 then determines whether the physical block address corresponding to the logical address is registered (S1003). When the physical block address is registered, step S1005 is executed.

Meanwhile, when the physical block address was not registered in step S1003, the address table generation subroutine in FIGS. 7 and 8 is executed (S1004). Once the address table generation subroutine is ended, step S1005 is executed.

In step S1005, user data are transferred to the host. In this transfer operation, the microcontroller 120 reads user data corresponding to the physical block address and sector address. These user data are transferred to the buffer 130 from the memory portion 140, and then output to the host via the host interface 110.

As explained above, the semiconductor device relating to the present embodiment, like the first embodiment, can realize a small scale buffer memory 130 and simplify control without requiring changes to the address used by the host.

In addition, the present embodiment can speed up the write operation because it is not necessary to read the address table into the buffer memory 151 when writing user data.

Furthermore, the present embodiment stores the table in the sector and can therefore guarantee a larger number of god user data regions than the first embodiment.

Third Embodiment

Figure 12:
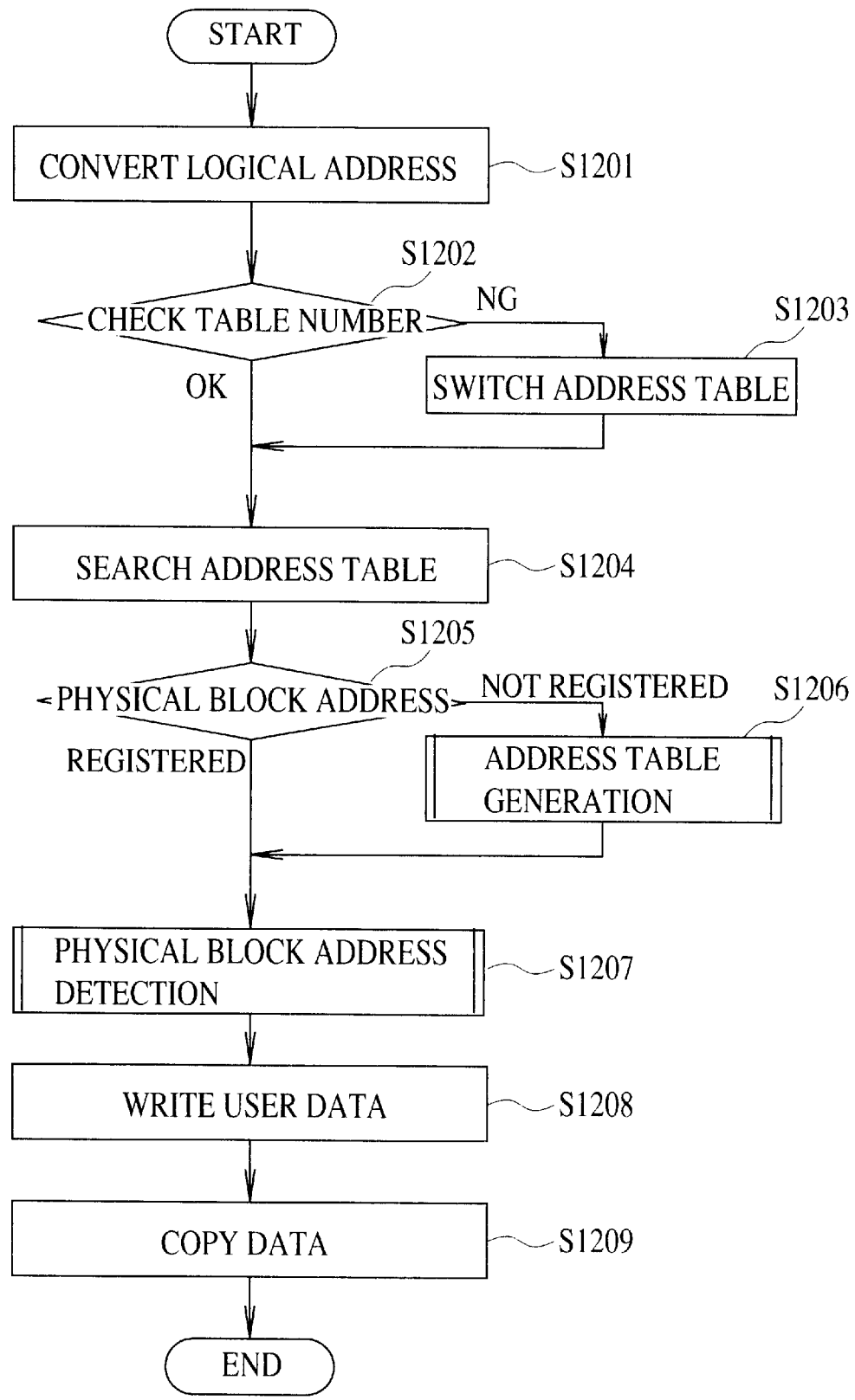
FIGS. 12 and 13 are flow charts for explaining the operations of the third embodiment.
Figure 13:
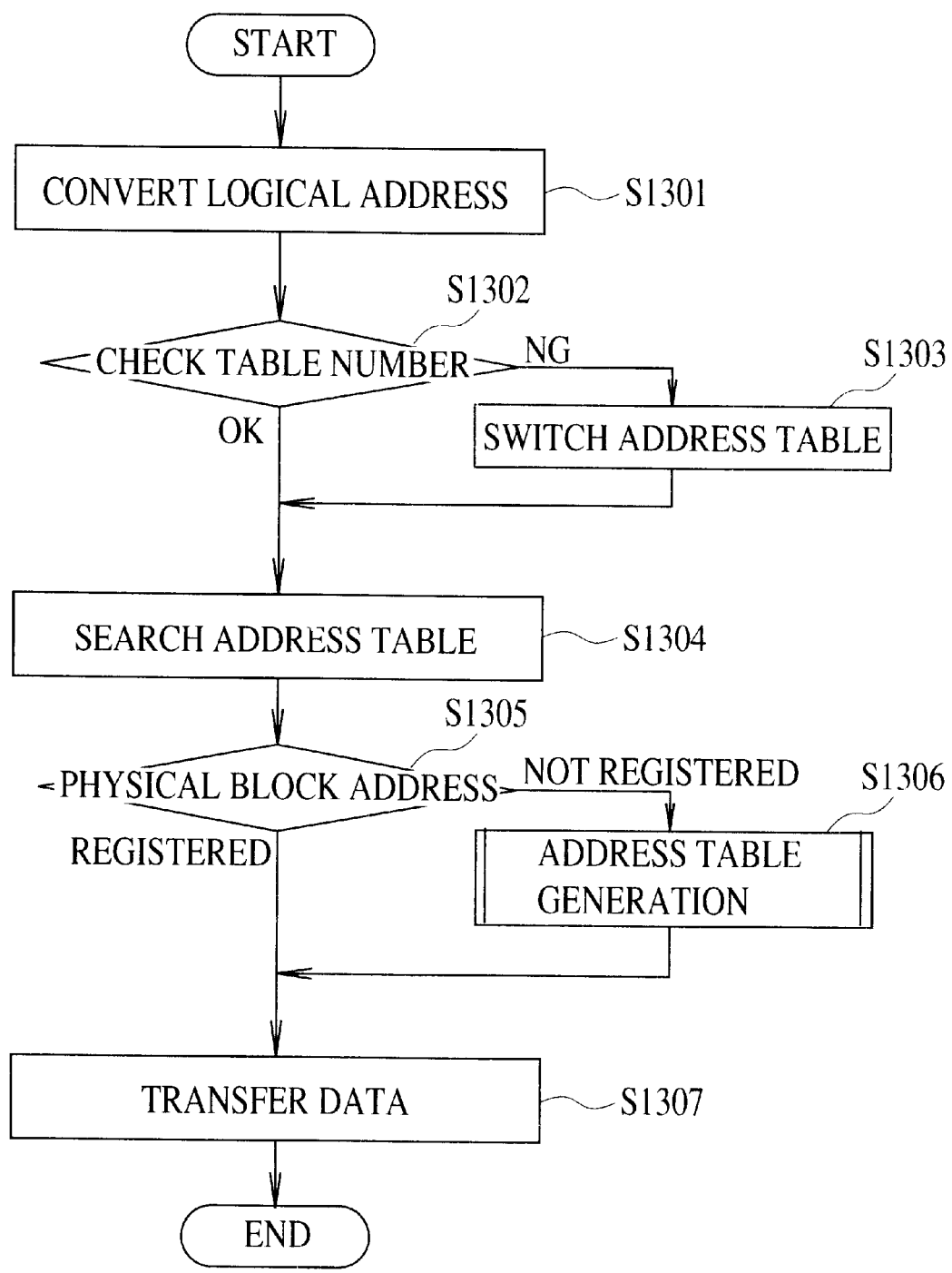
Figure 14A:
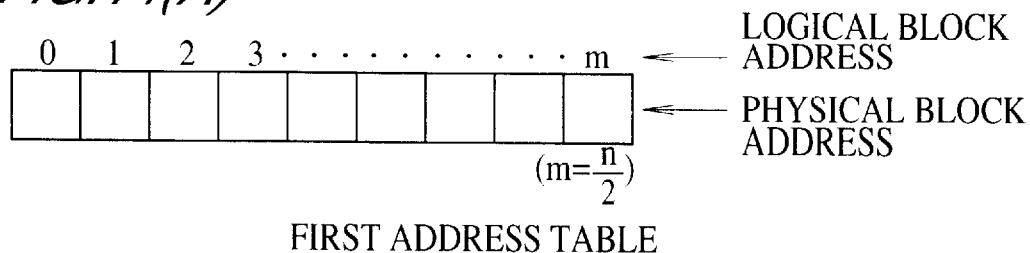
FIG. 14 is a conceptual diagram showing the control tables used in the fourth and fifth embodiments.
Figure 14B:
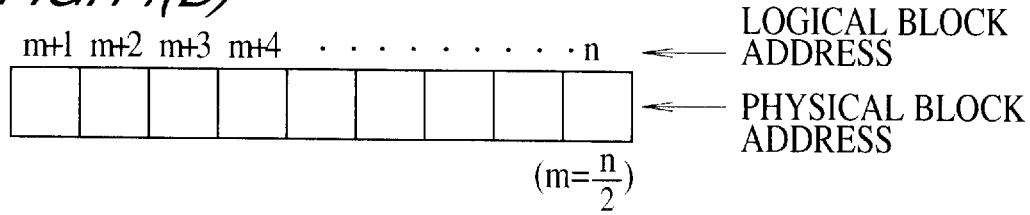
Figure 14C:
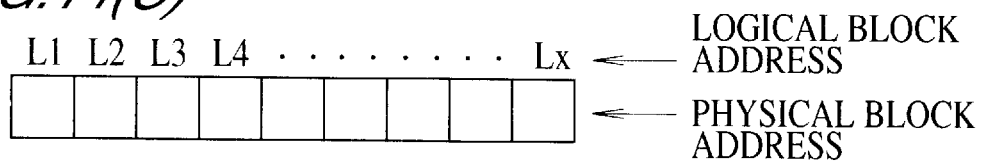
Figure 14D:
Figure 14E:
Figure 14F:

The third embodiment of the present invention is explained using FIGS. 11 to 13.

The circuit configuration of the semiconductor memory device relating to the present embodiment is the same as FIG. 1; an explanation thereof is therefore omitted. Also, the memory configuration of the semiconductor memory device relating to the present embodiment is the same as in FIG. 4; an explanation thereof is therefore omitted.

FIG. 11 shows the constitution of the control tables. (A) shows a first address table; (B) shows a second address table; (C) shows an address search block table; (D) shows a deleted data block table; and (E) shows the not yet assigned logical address block table.

In the present embodiment, like the second embodiment, the control tables are prepared in the buffer memory 151 in the address controller 150 and are not retained in the memory portion 140.

In the present embodiment, the block in the memory portion 140 is split into two block groups. The addresses for the first half of the n/2 blocks are managed with the first address table; the addresses for the second half of the n/2 blocks are managed with the second address table. In other words, the first address table shows the relationship between the first half of the logical block addresses and the first half of the physical block addresses. The second address table shows the relationship between the second half of the logical block addresses and the second half of the physical block addresses. Either the first address table or second address table is constructed in the buffer memory 151. When the other address table is used, the buffer memory 151 is initialized and a new address table is constructed again. In other words, the semiconductor memory device relating to the present embodiment has two address tables in concept, but in reality, one address table is constructed as appropriate.

One address search block table, one deleted data block table, and one not yet assigned logical address block table are established in the buffer memory 151. Information relating to the address table in use at that time is appropriately registered in these tables. Like the second embodiment, the address search block table shows the physical block address at which the search for generating the address table is started. The deleted data block table shows the leading physical block address in physical block addresses which correspond to blocks that do not contain data. The not yet assigned logical address block table shows the leading physical block address in physical block addresses which correspond to blocks that do contain data, and are not allocated logical block addresses.

Next, the write operation for the semiconductor memory device relating to the present embodiment is explained using the flow chart in FIG. 12.

When this semiconductor memory device is started up, the control tables in the buffer memory 151 are initialized. In this initialization operation, information to the effect that a matching physical block address is not present is written to the deleted data block table and the not yet assigned logical address block table. The physical block address for the leading block in the memory portion 140 is written to the address search block table. Furthermore, the first address table is generated in the buffer memory 151. Information to the effect that a matching physical block address is not present is written to the field of each logical block address in this first address table.

Next, the semiconductor memory device inputs the logical address and control signal from the host. The logical address and control signal are input to the microcontroller 120 via the host interface 110.

The microcontroller 120 converts this logical address to a logical block address and sector address (see S1201).

Next, the microcontroller 120 determines whether this logical block address is an address corresponding to the address table stored in the buffer memory 151 (S1202). When this logical block address does not correspond to this address table, the address table in the buffer memory 151 is =1;: switched to the other address table (S1203).

In this switching operation, information to the effect that a matching physical block address is not present is written to the deleted data block table and the not yet assigned logical address block table. In addition, when the first address table is stored in the buffer memory 151, the physical block address of the leading block in the second half block group in the memory portion 140 is written to the address search block table, and the second address table is generated in the buffer memory 151. Meanwhile, when the second address table is stored in the buffer memory 151, the physical block address of the leading block in the first half block group in the memory portion 140 is written to the address search block table, and the first address table is generated in the buffer memory 151. Information to the effect that a matching physical block address is not present is written to the field of each logical block address in the newly generated address table.

The microcontroller 120 searches for the physical block address corresponding to that logical block address using the address table (S1204). When the physical block address corresponding to the logical block address is detected, the processes from step S1207 onward are executed (S1205). Meanwhile, when the physical block address corresponding to the logical block address is not detected, an address table is generated by the execution of the subroutine in step S1206 (S1205).

The contents of the subroutine for generating the address table are the same as in the second embodiment (see FIGS. 7 and 8). However, the subroutine is different from the second embodiment in regards to generating the address table for only the first half block group or second half block group in the memory portion 140.

In step S1207, the subroutine for detecting the physical block address newly assigned to the logical address is executed.

The contents of this subroutine are the same as in the second embodiment; an explanation is therefore omitted (see FIG. 9).

Once the physical block detection subroutine has ended, the microcontroller 120 writes user data input from the host to the memory portion 140 (Sl2O8). This write operation is the same as the write operation in the second embodiment. In other words, data in the block are deleted when necessary, then user data stored in the buffer memory 130 are written to the specified sector. When user data are written to the leading sector in the block, the logical block address corresponding to this block is also written thereto.

Next the microcontroller 120 copies data to other sectors in the new storage location, specifically sectors other than the sector to which user data from the host are written (S1209). This copy operation is also the same as the copy operation in the second embodiment. Data are read sector by sector from the user data region 401 in the sectors of the old storage location, and written in order to the sectors in the new storage location. When user data are written to the leading sector in the block, the logical block address corresponding to this block is also written thereto. Block data overwriting part of sectors of the old storage location data are thereby stored in the new storage location. Finally, information to the effect that the logical address is not assigned is written to the control information region 402 of the leading sector of the old storage location.

Next, the operation for reading user data from the semiconductor memory device is explained using the flow chart in FIG. 13.

When the semiconductor memory device is started up, the control tables in the buffer memory 151 are initialized. In this initialization operation, information to the effect that a matching physical block address is not present is written to the deleted data block table and the not yet assigned logical address block table. Also, the physical block address of the leading block in the memory portion 140 is written to the address search block table. The firs t address table is then generated in the buffer memory 151. Information to the effect that a matching physical block address is not present is written to the field of each logical block address in this first address table.

Once the logical address and control signal are input to the microcontroller 120 via the host interface 110, the microcontroller 120 converts the logical address to a logical block address and sector address (S1301).

The microcontroller 120 checks whether this logical block address corresponds to the address table stored in the buffer memory 151 (S1302). When it does not correspond, the address table in the buffer memory 151 is switched to the other address table (S1303).

In this switching operation, information to the effect that a matching physical block address is not present is written to the deleted data block table and the not yet assigned logical address block table. Moreover, when the first address table is stored in the buffer memory 151, the physical block address of the leading block in the second half block group in the memory portion 140 is written to the address search block table. The second address table is then generated in the buffer memory 151. Meanwhile, when the second address table is stored in the buffer memory 151, the physical block address of the leading block in the first half block group in the memory portion 140 is written to the address search block table. The first address table is then generated in the buffer memory 151. Information to the effect that a matching physical block address is not present is written to the field for each logical block address in the newly generated address table.

The microcontroller 120 searches for a physical block address corresponding to that logical block address using the address table (S1304). Then the microcontroller 120 determines whether the physical block address corresponding to the logical block address is registered (S1305). When the physical block address is registered, the process in step S1307 is executed. Meanwhile, when the physical block address is not registered, the address table is generated with the execution of the subroutine in step S1306.

The contents of the subroutine for generating an address table are the same as in the case of the write operation of the second embodiment (see FIGS. 7 and 8). However, in this read operation, the address table is generated for only the first half block group or second half block group in the memory portion 140.

The microcontroller 120 then reads user data corresponding to the physical block address and sector address from the memory portion 140 and stores the data in the buffer 130. After that, the data stored in the buffer 130 is output to the host via the host interface 110 (S1307).

Like the first and second embodiments, the semiconductor device relating to the present embodiment can realize a small scale buffer memory 130 and is simple to control because it is not necessary to change the addresses used by the host.

Like the second embodiment, the present embodiment can have higher speed write operations because it is not necessary to read the address table into the buffer memory 151 when writing user data. Additionally, the present embodiment stores the table in the sector and can therefore guarantee a larger number of user data regions.

Moreover, in the present embodiment, the buffer memory 151 can have a small storage capacity because the address table is divided into a first half block group and a second half block group.

In the present embodiment, the block in the memory portion 140 is divided into two block groups; it may also be divided into three or more block groups with address tables prepared for each.

Fourth Embodiment

Figure 15:
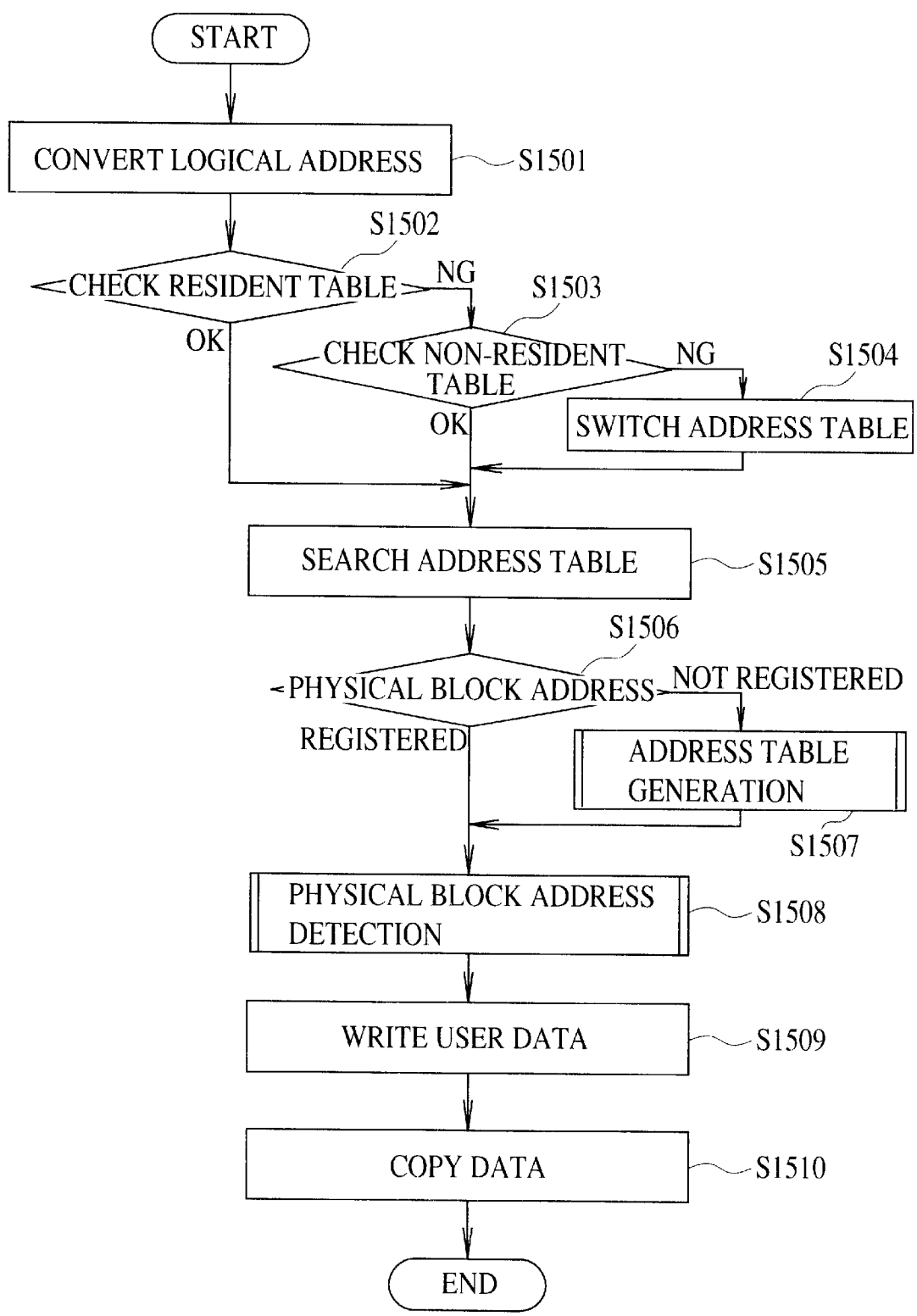
FIGS. 15 and 16 are flow charts for explaining the operations of the fourth embodiment.
Figure 16:
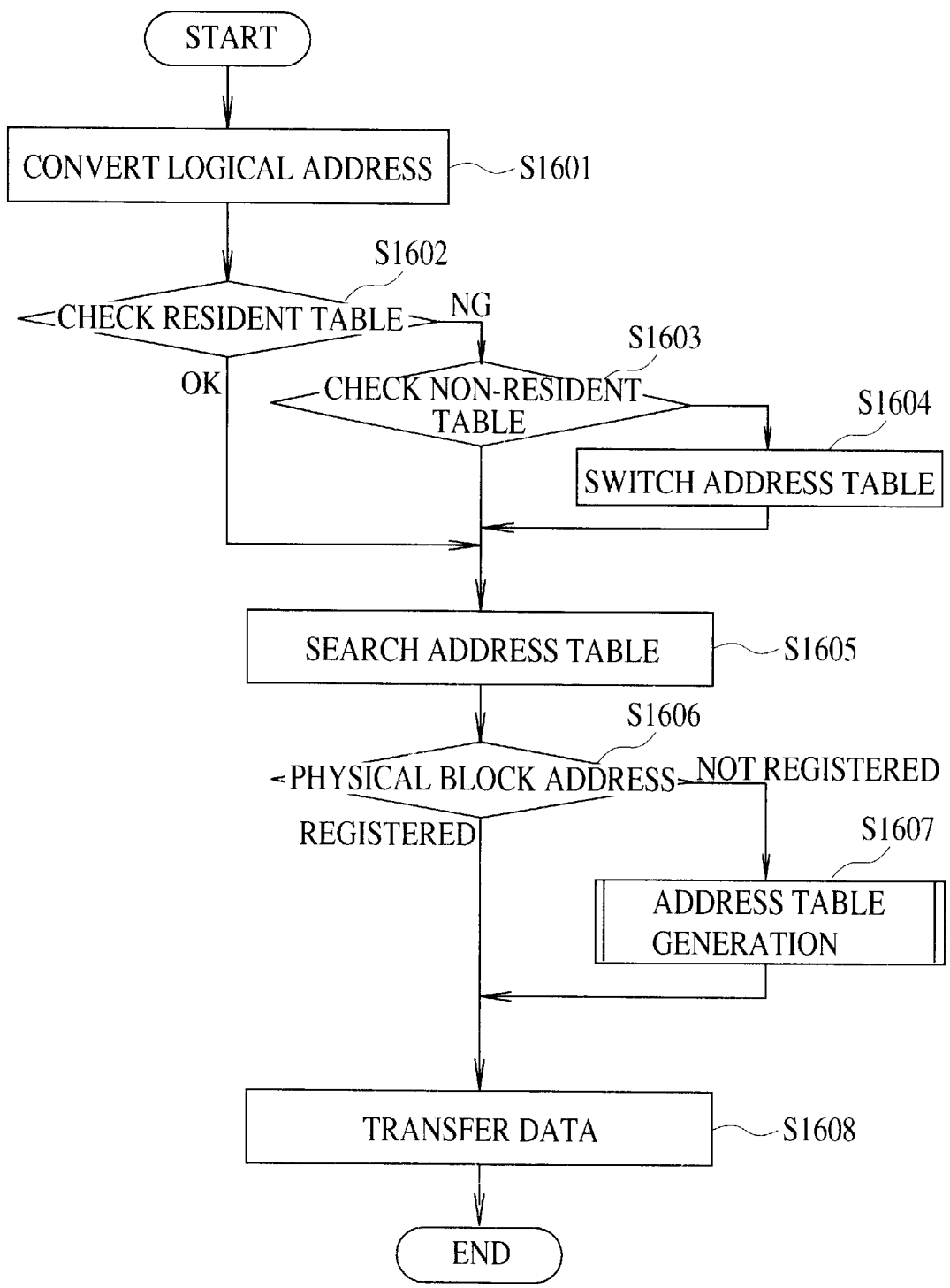

The fourth embodiment of the present invention is explained using FIGS. 14 to 16.

The circuit configuration of the semiconductor memory device relating to the present embodiment is the same as FIG. 1; an explanation thereof is therefore omitted. Also, the memory configuration of the semiconductor memory device relating to the present embodiment is the same as FIG. 4; an explanation thereof is therefore omitted.

FIG. 14 is a conceptual diagram of the constitution of the control tables. (A) shows the first address table, (B) shows the second address table, (C) shows the resident address table, (D) shows the address search block table, (E) shows the deleted data block table, and (F) shows the not yet assigned logical address block table.

Like in the second embodiment, the control tables are prepared in the buffer memory 151 in the address controller 150 and are not held in the memory portion 140.

In the present embodiment, as in the third embodiment, the blocks in the memory portion 140 are divided into two block groups. The addresses relating to the first half n/2 blocks are managed in the first address table and the addresses relating to the second half n/2 blocks are managed with the second address table. Furthermore, the present embodiment provides the resident address table as a third address table. The resident address table remains constructed in the buffer memory 151, and stores the relationship between userspecified logical block addresses and physical block addresses. For example, information for ten logical address blocks can be registered in the resident address table.

The address search block table, the deleted data block table, and the not yet assigned logical address block table are set up one by one. Information relating to the address table in use at that time is registered appropriately in these tables. As in the second and third embodiments, the address search block table shows the physical block address at which the search to generate the address table begins. The deleted data block table shows the leading physical block address in physical block addresses which correspond to blocks that do not contain data. The not yet assigned logical address block table shows the leading physical block address in physical block addresses which correspond to blocks that contain data and are not assigned logical block addresses.

Next, the write operation for the semiconductor memory device relating to the present embodiment is explained using the flow chart in FIG. 15.

When this semiconductor memory device is started up, the acontrol tables in the buffer memory 151 are initialized. In this initialization operation, information to the effect that a matching physical block address is not present is written to the dele ted data block table and the not yet assigned logical address block table. Also, the physical block address of the leading block in the memory portion 140 is written to the address search block table. The first address table is generated in the buffer memory 151. Information to the effect that a matching phy s ical block address is not present is written to the fields of all logical block addresses in this first address table. Moreover, information to the effect that a matching physical block address is not present is written the fields of all logical block addresses in the resident address table.

Next, the semiconductor memory device inputs the logical address and control signal from the host. The logical address and control signal are input to the microcontroller 120 via the host interface 110.

The microcontroller 120 converts the logical address to a logical block address and sector address (see S1501).

The microcontroller 120 determines whether this logical block address corresponds to the resident address table (S1502). When it does correspond to the resident address table, the microcontroller 120 executes the processes from step S1505 onwards.

Meanwhile, when the logical block address does not correspond to the resident address table in step S1502, the microcontroller 120 determines whether this logical block address corresponds to the non-resident address table stored in the buffer memory 151 (S1503). When the logical block address does not correspond to this address table, the non-resident address table is switched to another non-resident address table (S1504).

In this switching operation, information to the effect that a matching physical block address is not present is written to the deleted data block table and the not yet assigned logical address block table. Moreover, when the first address table is stored as the non-resident address table in the buffer memory 151, the physical block address of the leading block in the second half block group in the memory portion 140 is written to the address search block table; the second address table is then generated in the buffer memory 151. On the other hand, when the second address table is stored in the buffer memory 151, the physical block address of the leading block in the first half block group in the memory portion 140 is written to the address search block table and the first address table is generated in the buffer memory 151. Information to the effect that a matching physical block address is not present is written to the field of each logical block address in the newly generated address table.

Next the microcontroller 120 searches for the physical block address corresponding to that logical block address using the address table (S1505). When the physical block address corresponding to the logical block address is detected, the microcontroller 120 executes the processes from step S1508 onwards. On the other hand, when the physical block address corresponding to the logical block address is not detected, the first or second address table is generated with the execution of the subroutine in step S1507.

The contents of the subroutine for generating the address table are about the same as in the second embodiment (see FIGS. 7 and 8). However, the following processes are executed instead of those in step S801 in FIG. 8.

The microcontroller 120 determines whether the logical block address of block A is present in the resident address table. When it is present, the physical block address is registered in the resident address table. On the other hand, when it is not present, the physical block address is registered in the non-resident address table, specifically the first or second address table.

The subroutine for detecting the physical block address newly assigned to the logical address is executed in step S1508.

The contents of this subroutine are about the same as in the second embodiment (see FIG. 9). However, the following processes are executed instead of those in step S903 in FIG. 9.

The microcontroller 120 determines whether the logical block address, with a newly assigned physical block address, is present in the resident address table. When it is present, the physical block address is registered in the resident address table. On the other hand, when it is not present, the the physical block address is registered in the non-resident address table, specifically the first or second address table.

When the subroutine for detecting the physical block has ended, the microcontroller 120 writes user data input from the host to the memory portion 140 (S1509). This write operation is the same as the write operation in the second embodiment. When necessary, data in the block are deleted, then user data stored in the buffer memory 130 are written to the designated sector. When user data are written to the leading sector of the block, the logical block address corresponding to this block is written thereto as well.

Next the microcontroller 120 copies data to other sectors in the new storage location, specifically sectors other than the sector to which user data from the host are written (S1510). This copy operation is also the same as the copy operation in the second embodiment. The data are read sector by sector from the user data region 401 in the sectors of the old storage location and written in order to the sectors in the new storage location. When the user data are written to the leading sector of the block, the logical block address corresponding to this block is written thereto as well. Block data, with part of sectors of data in the old storage location overwritten, are thereby stored in the new storage location. Finally, information to the effect that the logical address is not assigned is written to the control information region 402 of the leading sector in the old storage location.

Next, the operation for reading user data from the semiconductor memory device is explained using FIG. 16.

When the semiconductor memory device is started up, the control tables in the buffer memory 151 are initialized. In this initialization operation, information to the effect that a matching physical block address is not present is written to the deleted data block table and the not yet assigned logical address block table. Also, the physical block address of the leading block of the memory portion 140 is written to the address search block table. Furthermore, a first address table is prepared in the buffer memory 151. Information to the effect that a matching physical block address is not present is written to the field of each logical block address in this first address table. Moreover, information to the effect that a matching physical block address is not present is written to the field of all logical block addresses in the resident address table.

Once the logical address and the control signal are input to the microcontroller via the host interface 110, the microcontroller 120 converts the logical address to a logical block address and sector address (S1601).

The microcontroller 120 checks whether this logical block address corresponds to the resident address table (S1602). When the logical block address corresponds to the resident address table, the processes from step S1605 onwards are executed.

Meanwhile, when the logical block address does not correspond to the resident address table in step S1602, the microcontroller 120 checks whether this logical block address corresponds to the non-resident address table stored in the buffer memory 151 (S1603). When the logical block address does not correspond, this non-resident address table is switched to another non-resident address table (S1604).

In this switching operation, information to the effect that a matching physical block address is not present is written to the deleted data block table and the not yet assigned logical address block table. Moreover, when the first address table is stored in the buffer memory 151, the physical block address of the leading block in the second half block group in the memory portion 140 is written to the address search block table, then the second address table is generated in the buffer memory 151. Meanwhile, when the second address table is stored in the buffer memory 151, the physical block address of the leading block of the first half block group in the memory portion 140 is written to the address search block table, then the first address table is generated in the buffer memory 151. Information to the effect that a matching physical block address is not present is written to the field of each logical block address in the newly generated address table.

The microcontroller 120 searches for a physical block address corresponding to the logical block address using the address table (S1605). Then the microcontroller 120 determines whether the physical block address corresponding to the logical block address is registered (S1606). When the physical block address is registered, the process in step S1608 is executed. On the other hand, when the physical block address is not registered, the address table is generated by the execution of the subroutine in step S1607.

The contents of the subroutine for generating the address table are the same as in the case of the write operation in the second embodiment (see FIGS. 7 and 8). However, instead of the process in step S801 in FIG. 8, the microcontroller 120 determines whether the logical block address of the block A is present in the resident address table and, when the logical block address is present, registers the physical block address in the resident address table. When the logical block address is not present, the microcontroller 120 registers the physical block address in the non-resident address table.

Then the microcontroller 120 reads the user data corresponding to the physical block address and sector address from the memory portion 140 and stores the data in the buffer 130. Afterwards, the data stored in the buffer 130 are output to the host via the host interface 110 (S1608).

In this way, the semiconductor memory device relating to the present embodiment uses a resident address table to manage the logical addresses for frequently reading and writing user data. Consequently, frequency of preparing address tables in the buffer memory 151 can be reduced.

Moreover, the semiconductor memory device relating to the present embodiment has the same effects as the semiconductor memory devices relating to the first through third embodiments.

In the present embodiment, the block in the memory portion 140 is divided into two block groups; it may also be divided into three or more block groups with address tables prepared for each.

Fifth Embodiment

The fifth embodiment relating to the present invention is explained using FIGS. 17 to 24.

The circuit configuration of the semiconductor memory device relating to the present embodiment is the same as FIG. 1; an explanation thereof is therefore omitted.

In the present embodiment, the same logical block address is assigned to two of the n blocks included in the memory portion 140. In the present embodiment, these two blocks are called "split blocks." Of these two split blocks, the block to which this logical block address is assigned first is called the "pre-move split block" and the block to which this logical block address is assigned last is called the "post-move split block."

Also, the memory configuration of the semiconductor memory device relating to the present embodiment is the same as FIG. 4. In the present embodiment, the same information as in the second embodiment is stored in the control information region 402 of the leading sector in each block. In addition, when that block is a split block, the classification of that block as the pre-move split block or post-move split block is stored in the leading sector. Information indicating the validity/invalidity of the user data stored in that sector is stored in the control information region 402 of all sectors in the pre-move block.

The semiconductor memory device relating to the present embodiment uses the same control tables as in the fourth embodiment (see FIG. 14). The semiconductor memory device relating to the present embodiment has a resident address table like the device in the fourth embodiment.

Moreover, the semiconductor memory device relating to the present embodiment generates split block control tables within the buffer memory 151.

Figure 17A:
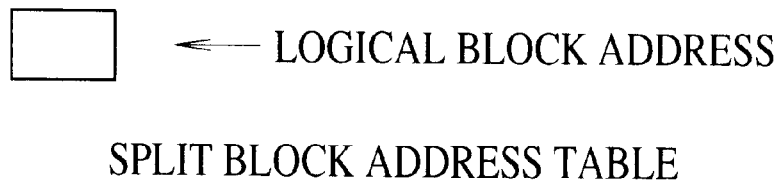
FIG. 17 is a conceptual diagram showing the divided block control tables used in the fifth embodiment.
Figure 17B:
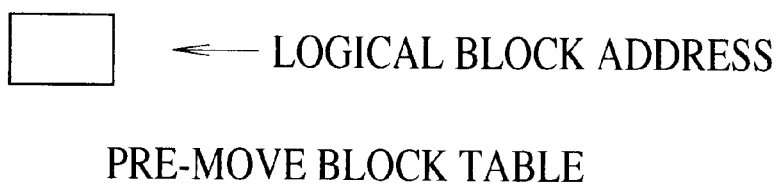
Figure 17C:
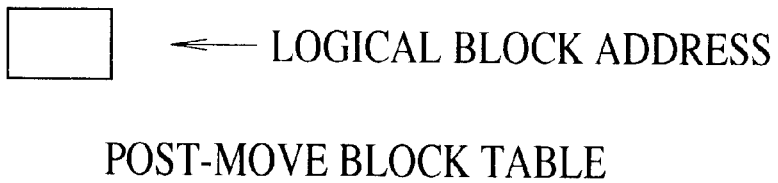
Figure 18:
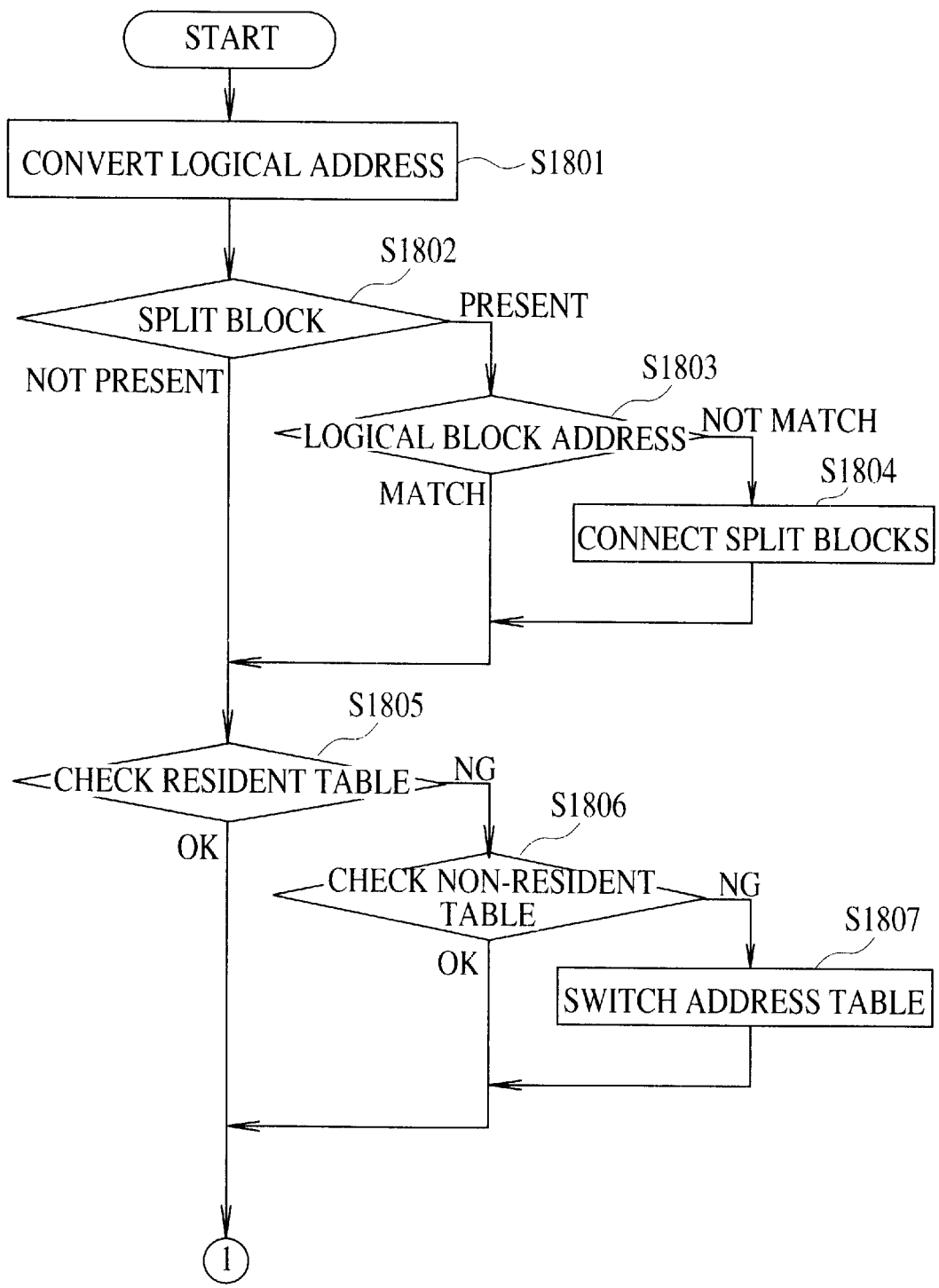

FIG. 17 is a conceptual diagram showing the divided block control tables. (A) shows the split block address table, (B) shows the pre-move block table, (C) shows the post-move block table. The split block address table shows the logical block address assigned to that split block when the split block is present. The pre-move block table shows the physical block address of the pre-move split block when the split block is present. The post-move block table shows the physical block address of the post-move split block when the split block exists.

Figure 22:
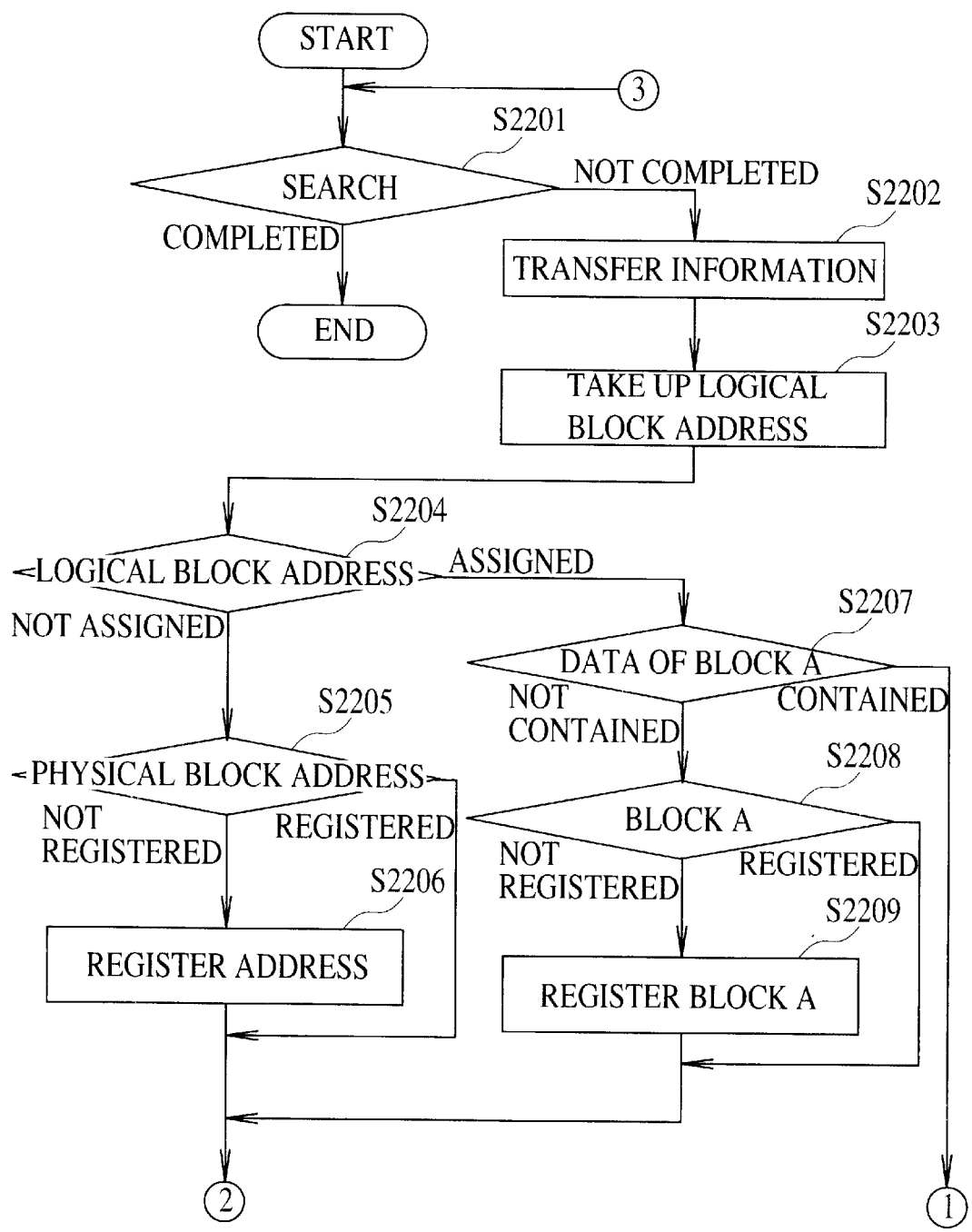
Figure 23:
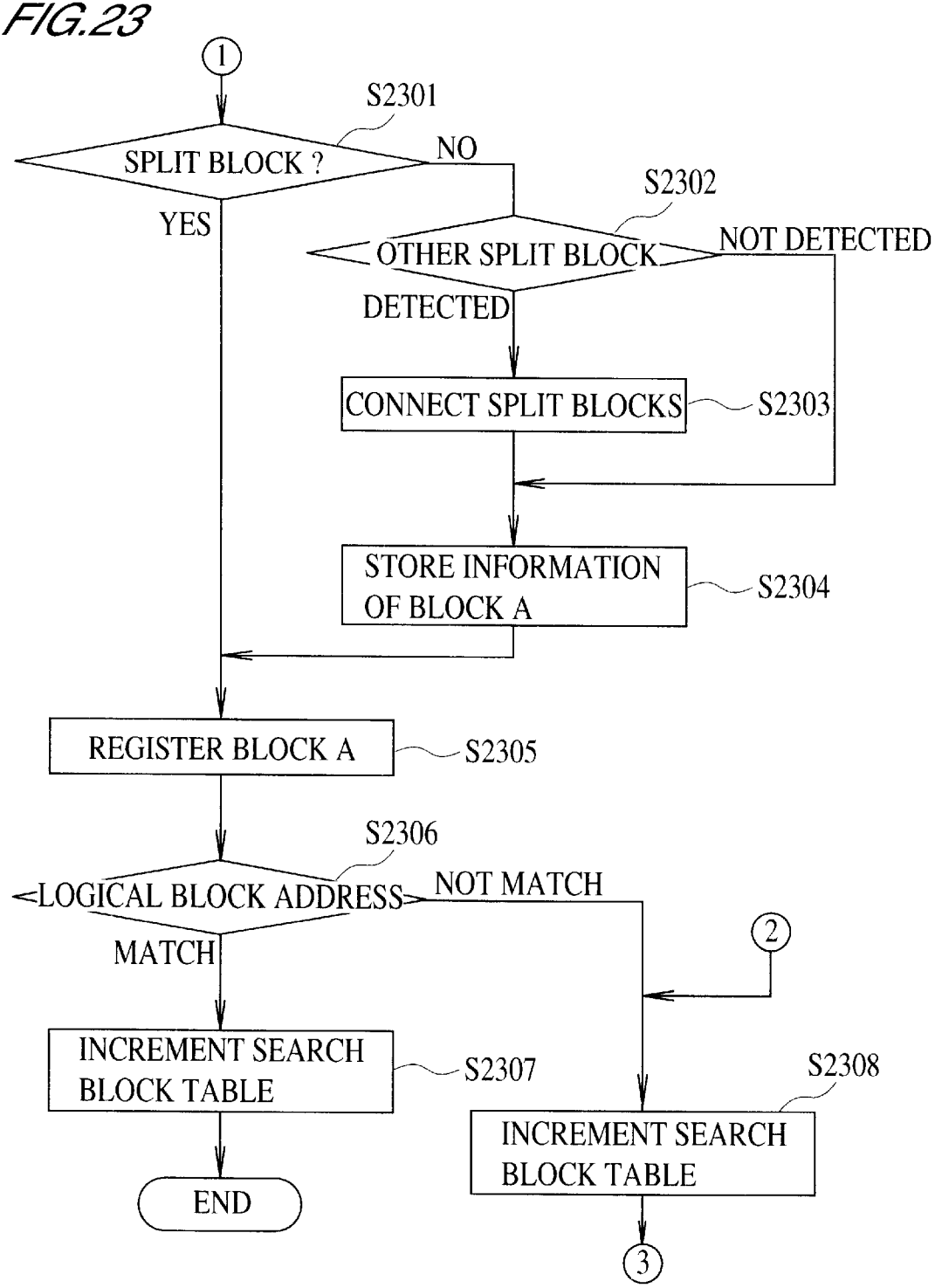

Next, the write operation of the semiconductor memory device relating to the present embodiment is explained using the flow charts in FIGS. 18 to 23. FIGS. 18 to 21 show a flow chart of the entire write operation. FIGS. 22 and 23 are flow charts of subroutines.

When this semiconductor memory device is started up, the control tables and split block control tables in the buffer memory 151 are initialized. In this initialization operation, information to the effect that a matching physical block address is not present is written to the deleted data block table, the not yet assigned logical address block table, the pre-move block address table, and the post-move block address table. Information to the effect that a matching logical block address is not present is written to the split block address table. The physical block address of the leading block in the memory portion 140 is written to the address search block table. A first address table is generated in the buffer memory 151. Information to the effect that a matching physical block address is not present is written to the fields of all logical block addresses in this first address table. Moreover, information to the effect that a matching physical block address is not present is written to the fields of all logical block addresses in the resident address table.

Next, the semiconductor memory device inputs the logical address and control signal from the host. The logical address and control signal are input to the microcontroller 120 via the host interface 110.

The microcontroller 120 converts this logical address to a logical block address and sector address (see S1801).

The microcontroller 120 determines whether the split block is present in the memory portion 140 (S1802). When the split block is not present, the microcontroller 120 executes the processes from step S1805 onwards.

On the other hand, when the split block does exist in step S1802, the microcontroller 120 determines whether the logical block address of this split block matches the logical block address input from the host (S1803). When these addresses match, the microcontroller 120 executes the processes from step S1805 onwards.

Meanwhile, when the addresses do not match in step S1803, the microcontroller 120 connects the split blocks (S1804). In connecting the split blocks, the validity/invalidity of user data stored in that sector is determined using information stored in the control information region 402 of that sector in the post-move block. "Invalid user data" means the state when data in the user data storage region 401 are deleted. When user data are invalid, user data stored in the sector with the same sector address as this sector are read from the pre-move block into the buffer memory 130 and stored in this sector. Meanwhile, when the user data in this sector are valid, the user data are not moved. This process is executed for all sectors in the post-move block. Next, information indicating that this is an unused sector, where this block is not assigned a logical block address, and information indicating that this block is not a split block are stored in the control information region 402 of the leading sector in the pre-move block. As discussed above, when FAT is used for the storage elements, it is not necessary to delete data when overwriting a 1 with a 0. Consequently, if information to the effect that a logical address is assigned is expressed as 1 and information to the effect that a logical address is not assigned is expressed as 0, then the table can be switched without the deletion of data in the block. Likewise, if information to the effect that the block is a split block is expressed as 1 and information to the effect that the block is not a split block is expressed as 0, then the table can be switched without the deletion of data in the block. Then, information to the effect that a matching physical block address is not present is written to the pre-move block address table and the post-move block address table; and information to the effect that a matching logical block address is not present is written to the split block address table. Afterwards the microcontroller 120 executes the processes from step S1805 onwards.

In step S1805, it is determined whether the logical block address input from the host corresponds to the resident address table. When it does correspond to the resident address table, the processes from step S1901 onwards are executed.

On the other hand, when the logical block address does not correspond to the resident address table in step S1805, the microcontroller 120 determines whether this logical block address corresponds to the non-resident address table stored in the buffer memory 151 (S1806). When the logical block address does not correspond to this address table, this non-resident address table is switched to the other non-resident address table (S1807). The details of this switching operation are the same as in the case of the fourth embodiment; an explanation is therefore omitted (see step S1606 in FIG. 16).

Next, the microcontroller 120 searches for the physical block address corresponding to that logical block address using the address table (S1901). When a physical block address corresponding to the logical block address is detected, the microcontroller 120 executes the processes from step S1904 onwards. On the other hand, when a physical block address corresponding to the logical block address is not detected, the microcontroller 120 generates the first or second address table by executing the subroutine in step S1903.

The address table is prepared as follows (see FIGS. 22, 23).

The physical block address stored in the address search table is compared with the physical block address of the final block in the memory portion 140 (S2201). When the value of the stored physical block address is greater than or equal to the final physical block address value, preparation of the address table is determined to be complete and the subroutine ends.

Meanwhile, when the stored physical block address value is less than the final physical block address value, the preparation of the address table is determined to be incomplete. Information stored in the control information region 402 of the leading sector of the block indicated by the stored physical block address is read and stored in the buffer memory 151 (S2202). In the following explanation, the block indicated by the stored physical block address is referred to as "block A."

The microcontroller 120 takes up information relating to the status of block A from the control information region 402 stored in the buffer memory 151. "Status" means any of the following: the status wherein the block contains data and is assigned a logical block address; the status wherein the block does not contain data and is not assigned a logical block address; and the status wherein the block does contain data and is not assigned a logical block address.

When block A is in the state where data are stored and a logical block address is assigned, specifically a used state, the microcontroller 120 takes up the logical block address of block A from the control information region 402 (S2203).

Next, the microcontroller 120 uses the information taken from the control information region 402 to determine whether a logical block address is assigned to block A (S2204). When a logical block address is not assigned to block A, the microcontroller 120 determines whether the physical block a address of some blocks is registered in the not yet assigned block table (S2205). When the physical block address is registered, the microcontroller 120 executes the processes from step S2308 onwards. On the other hand, when the physical block address is not registered, the microcontroller 120 registers the physical block address of block A in the not yet assigned block table (S2206) and executes the processes from step S2308 onwards.

When it is determined that a logical block address is assigned to block A in step S2204, the microcontroller 120 uses information taken from the control information region 402 and determines whether data are stored in block A (S2207). When data are not stored in block A, the microcontroller 120 then determines whether the physical block address of some blocks is registered in the not yet assigned block table (S2208). When the physical block address is registered, the microcontroller 120 executes the processes from step S2308 onwards. On the other hand, when the physical block address is not registered, the microcontroller 120 registers the physical block address of block A in the not yet assigned block table (S2209) and executes the processes from step S2308 onwards.

When it is determined that data are stored in block A in step S2207, block A is then a block with an assigned logical block address. The microcontroller 120 determines whether this block is a split block using the split block control table (S2301). When this block is not a split block, the microcontroller 120 executes the processes from step S2305 onwards.

On the other hand, when this block is a split block, the microcontroller 120 determines whether a set of split blocks has already been detected (S2302). This determination is made by checking whether the physical block address is registered in the pre-move block address table and post-move block address table. When a split block is not detected, processes from step S2304 onwards are executed.

Meanwhile, when split blocks have already been detected, the already detected split blocks are connected (S2303). This connection procedure is the same as in step S1804 and an explanation is therefore omitted.

In step S2304, the microcontroller 120 stores the information on block A in the split block control tables. In this storage operation, the logical block address corresponding to block A is stored in the split block address table. Furthermore, when the block A is a pre-move split block, the physical block address is stored in the pre-move block table. Meanwhile, when the block A is a post-move split block, the physical block address is stored in the post-move block table.

In step S2305, the physical block address of block A is registered in the field of the logical block address in this resident address table or non-resident address table (S2306). In other words, when this logical address is registered in the resident address table, the physical block address is registered in the resident address table; when this logical address is not registered in the resident address table, the physical block address is registered in the non-resident address table.

Next, the microcontroller 120 compares this logical block address with the logical address input from the host (S2306). When the addresses match, the microcontroller 120 updates the physical block address registered in the search block table by incrementing the physical block address (S2307) and ends the subroutine. Meanwhile, when the addresses do not match in step S2306, the processes from step S2308 onwards are executed.

In step S2308, the microcontroller 120 updates the physical block address registered in the search block table by incrementing the physical block address, then executes the processes from step S2201 onwards for the next physical block address.

Figure 19:
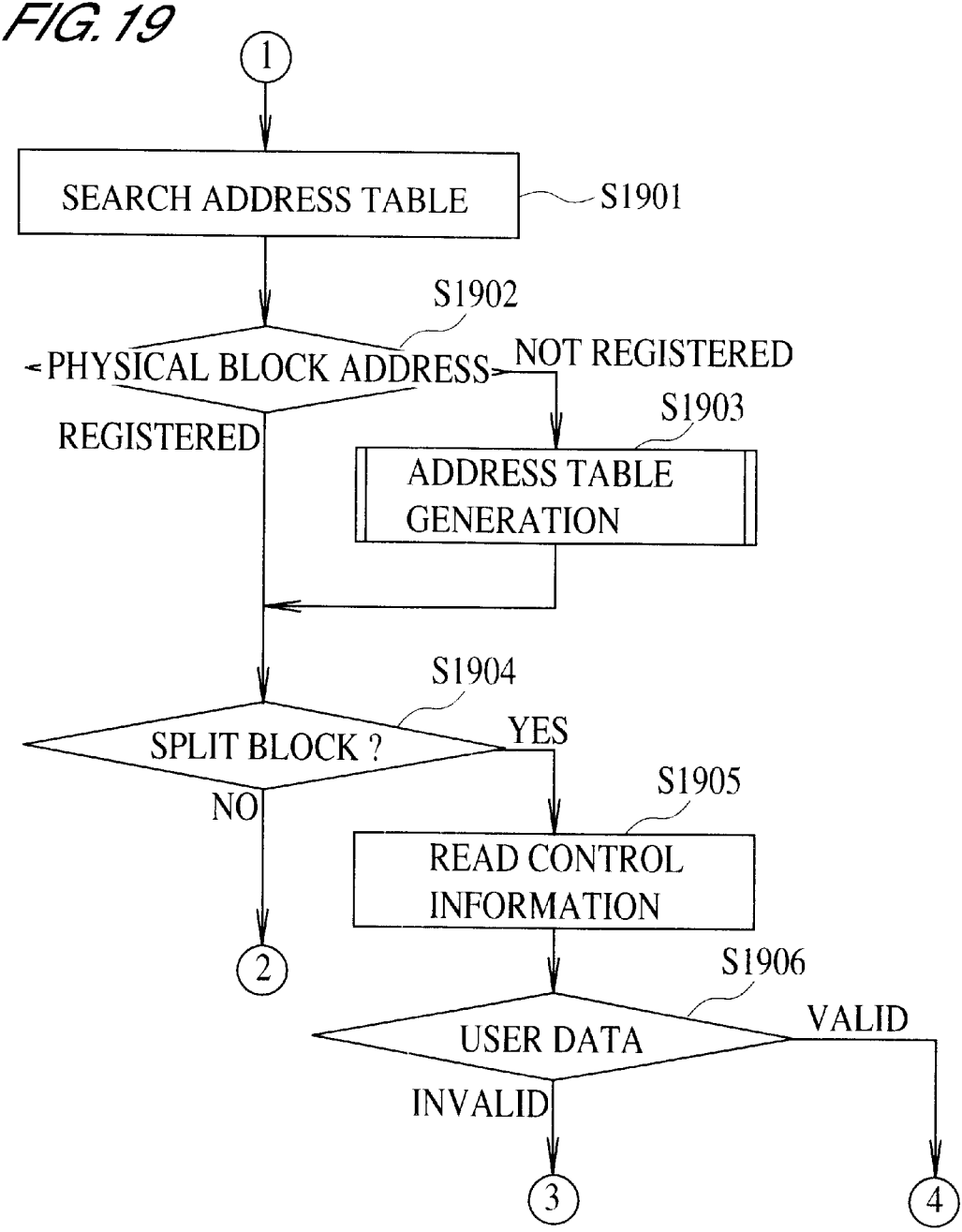

Once preparation of the address table ends, the microcontroller 120 then determines the method for writing data to the memory portion 140 (see FIG. 19).

In this determination, the split block address table is used to determine whether the block corresponding to the logical block address input from the host is a split block (S1904). When the block is not a split block, the microcontroller 120 executes the write process A (see (A) in FIG. 20).

When the block is found to be a split block in step 1904, the microcontroller 120 reads information in the control information region 402 from the sector of this pre-move split block corresponding to the sector address input from the host and stores this information in the buffer memory 151. The microcontroller 120 uses this control information and determines the validity/invalidity of the user data in this sector (S1906). The microcontroller 120 executes the write process B (see (B) in FIG. 20) when the user data is invalid and executes the write process C (see FIG. 21) when the user data is valid.

Figure 20A:
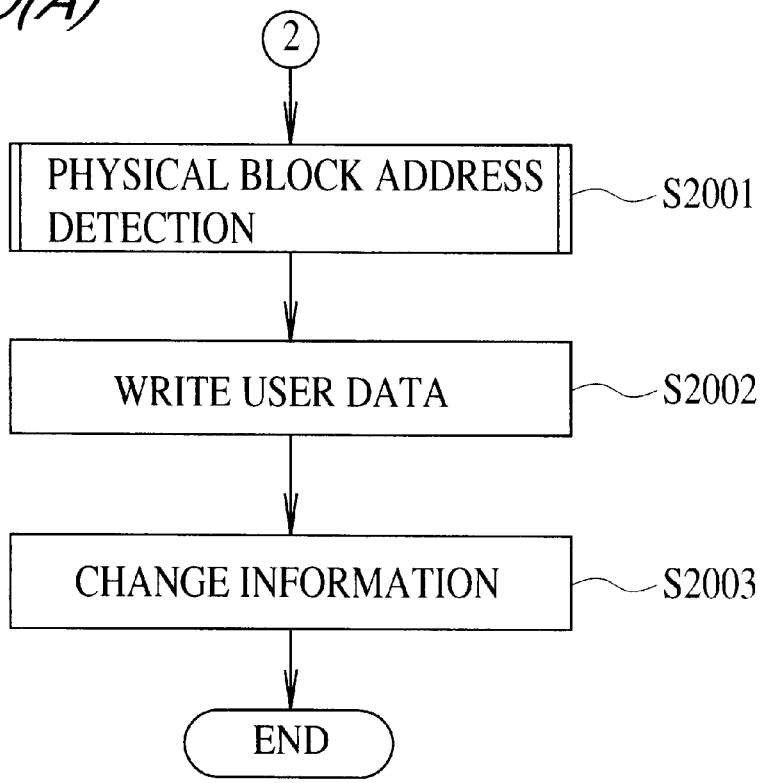
Figure 20B:
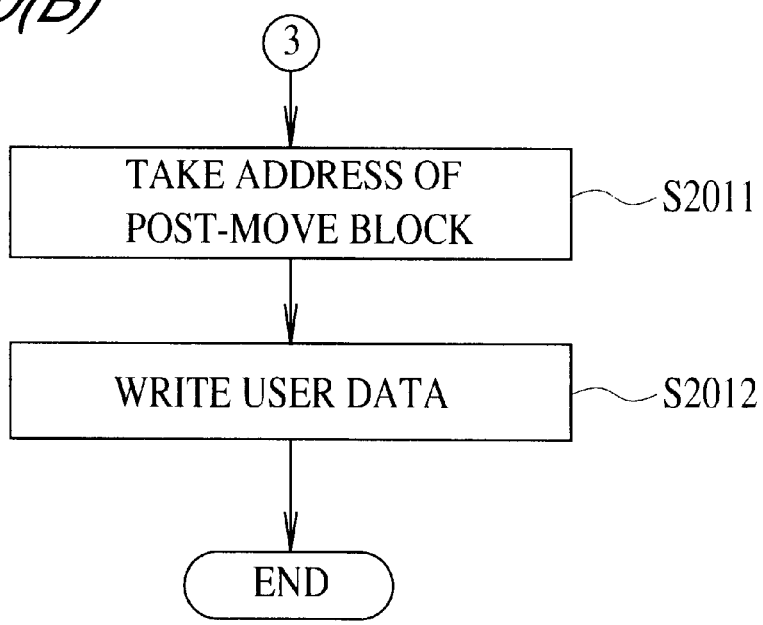

FIG. 20 (A) shows the procedure for the write process A.

The subroutine for detecting the physical block address newly assigned to the logical address is executed in step S2001.

The contents of this subroutine are the same as in the case of the second embodiment (see FIG. 9). However, the following processes are executed instead of step S903 in FIG. 9.

The microcontroller 120 determines whether the logical block address newly assigned the physical block address is present in the resident address table. When present, the physical block address is registered in the resident address table. On the other hand, when not present, the physical block address is registered in the non-resident address table, specifically the first or second address table.

Once the subroutine for detecting the physical block has ended, the microcontroller 120 writes user data input from the host to the memory portion 140 (S2002). This write operation is the same as the write operation in the second embodiment. In other words, data in the block are deleted when necessary, then user data stored in the buffer memory 130 are written to the designated sector. When user data are written to the leading sector of the block, the logical block address corresponding to this block and information indicating that that block is a post-move split block is written as well.

Next, the microcontroller 120 changes the control information of the sector (S2003). In this change operation, when the sector to which user data are written is not the leading sector of the block, information indicating that that block is a post-move split block and information indicating that the data in the leading sector thereof are invalid are written to the control information region 402 of the leading sector of that block. Moreover, information indicating that the block is a pre-move split block is written to the control information region 402 of the leading sector of the block that is the old storage location. When FAT is used as the storage element, as discussed above, data deletion is not necessary except when 0 overwrites 1. Consequently, if the information to the effect that the block is not a pre-move split block is expressed with 1 and the information to the effect that [the block] is a pre-moove split block is expressed with 0, then the microcontroller 120 can overwrite the table without deleting the data in the old storage location. This ends the write operation.

FIG. 20 (B) shows the procedures for the write process B.

The physical block address of the post-move split block is taken from the post-move block table (S2011).

Next, the user data are written to the sector specified by the sector address input from the host and this physical block address (S2012). After being stored once in buffer memory 130, the user data are written to this sector. This ends the write operation.

FIG. 21 shows the procedures for the write process C.

A subroutine for detecting the physical block address newly assigned to the logical address is executed in step S2101.

The contents of this subroutine are the same as in the case of the second embodiment (see FIG. 9). However, the following processes are executed instead of step S903 in FIG. 9.

The microcontroller 120 determines whether the logical block address newly assigned the physical block address is present in the resident address table. When present, the physical block address is registered in the resident address table. On the other hand, when not present, the physical block address is registered in the non-resident address table, specifically the first or second address table.

Once the subroutine for detecting the physical block has ended, the microcontroller 120 writes user data input from the host to the memory portion 140 (S2102). This write operation is the same as the write operation in the second embodiment. In other words, data inthe block are deleted when necessary, then user data stored in the buffer memory 130 are written to the designated sector. When user data are written to the leading sector of the block, the logical block address corresponding to this block is written as well.

Next, the microcontroller 120 copies data to the newly assigned block as discussed below (S2103). In this copy operation, the following processes (i) and (ii) are performed for all sectors in the post-move split block.

(i) Read data stored in the control information region from a sector in the post-move split block determine the validity or invalidity of the user data stored in that sector. In this determination, "valid" user data means that data are present in the user data region 401 and "invalid" user data means that data in the user data region 401 are deleted.

(ii) When user data in the sector of the post-move split block are valid, send user data from this sector to the buffer memory 130. Next, write the user data from the buffer memory 130 to the sector of the block indicated with the physical block address newly assigned in step S2101. This write operation is performed for the sector having the same sector address as the sector in the post-move split block. When user data are written to the leading sector of the newly assigned block, write the new logical block address to the control information region 402 of this sector at the same time. On the other hand, when the user data in the sector of the post-move split block are invalid, transfer the user data to the buffer memory 130 from that sector in the pre-move split block with the same sector address as this sector. Next, the user data are written from the buffer memory 130 to the sector of the block shown with the physical block address newly assigned in step S2101. This write operation is performed for the sector having the same sector address as the sector in the post-move split block. When user data are written to the leading sector of the newly assigned block, write the new logical block address to the control information region 402 of this sector at the same time.

The microcontroller 120 then changes the control information of the sector (S2104). In this change operation, information indicating that a logical block address is not assigned to that block is written to the control information regions 402 of the leading sectors in the pre-move split block and post-move split block. When FAT is used as the storage element, as discussed above, data deletion is not necessary except when 0 overwrites 1. Consequently, if the information to the effect that a logical block is assigned is expressed with 1 and the information to the effect that a logical block is not assigned is expressed with 0, then the microcontroller 120 can overwrite the table without deleting the data in the old storage location. This ends the write operation.

Next, the operation for reading user data from the semiconductor memory device is explained using FIG. 24.

When the semiconductor memory device is started up, the control tables in the buffer memory 151 are initialized. In this initialization operation, information to the effect that a matching physical block address is not present is written to the deleted data block table, the not yet assigned logical address block table, the pre-move block address table, and the post-move block address table. Information to the effect that a matching logical block address is not present is written to the split block address table. The physical block address of the leading block in the memory portion 140 is written to the address search block table. A first address table is generated in the buffer memory 151. Information to the effect that a matching physical block address is not present is written to the fields of all logical block addresses in this first address table. Moreover, information to the effect that a matching physical block address is not present is written to the fields of all logical block addresses in the resident address table.

Once the logical address and the control signal are input to the microcontroller via the host interface 110, the microcontroller 120 converts the logical address to a logical block address and sector address (S2401).

The microcontroller 120 checks whether this logical block address corresponds to the resident address table (S2402). When the logical block address corresponds to the resident address table, the processes from step S2405 onwards are executed.

Meanwhile, when the logical block address does not correspond to the resident address table in step S2402, the microcontroller 120 checks whether this logical block address corresponds to the non-resident address table stored in the buffer memory 151 (S2403). When the logical block address does not correspond, this non-resident address table is switched to another non-resident address table (S2404).

In this switching operation, information to the effect that a matching physical block address is not present is written to the deleted data block table and the not yet assigned logical address block table. Moreover, when the first address table is stored in the buffer memory 151, the physical block address of the leading block in the second half block group in the memory portion 140 is written to the address search block table, then the second address table is generated in the buffer memory 151. Meanwhile, when the second address table is stored in the buffer memory 151, the physical block address of the leading block of the first half block group in the memory portion 140 is written to the address search block table, then the first address table is generated in the buffer memory 151. Information to the effect that a matching physical block address is not present is written to the field of each logical block address in the newly generated address table.

The microcontroller 120 searches for a physical block address corresponding to the logical block address using the address table (S2405). Then the microcontroller 120 determines whether the physical block address corresponding ato the logical block address is registered (S2406). When the physical block address is registered, the processes from step S2408 onwards are executed. On the other hand, when the physical block address is not registered, the address table is generated by the execution of the subroutine in step S2407.

The contents of the subroutine for generating the address table are the same as in the case of the write operation in the second embodiment (see FIGS. 7 and 8). However, instead of the process in step S801 in FIG. 8, the microcontroller 120 determines whether the logical block address of the block A is present in the resident address table and, when the logical block address is present, registers the physical block address in the resident address table. When the logical block address is not present, the microcontroller 120 registers the physical block address in the non-resident address table.

In step S2408, the split block address table is used to determine whether the block corresponding to the logical block address input from the host is a split block. When this block is not a split block, user data corresponding to the physical block address and sector address are read from the memory portion 140 and stored in the buffer 130. Then, data stored in the buffer 130 are output to the host via the host interface (S2409). This ends the read operation.

Meanwhile, when it is determined in step S2408 that the block is a split block, the microcontroller 120 then selects the sector, corresponding to the sector address input from the host, from the post-move block. The microcontroller 120 reads information stored in the control information region 402 of the selected sector and determines the validity/invalidity of the user data stored in this sector (S2410). In this determination, "validity" means that data are present in the user data region 401 and "invalidity" means that data in the user data region 401 are deleted.

When user data are valid, the microcontroller 120 reads user data, corresponding to the sector address input from the host, from the post-move block and stores the data in the buffer 130. Then the microcontroller 120 outputs data stored in the buffer 130 via the host interface 110 to the host (S2411). This ends the read operation.

Meanwhile, when the user data are invalid, user data corresponding to the sector address input from the host are read from the pre-move block and store din the buffer 130. Data stored in the buffer 130 are then output to the host via the host interface 110 (S2411). This ends the read operation.

The semiconductor device relating to the present embodiment features division into split blocks, specifically into two blocks corresponding to one logical address. When writing user data continuously to sectors with the same logical block address, it is therefore unnecessary to copy the user data to the block which is the new storage location (see step S1510 in FIG. 15). Consequently, the semiconductor device relating to the present embodiment can carry out the write operation at higher speeds than the semiconductor device in the fourth embodiment.

In addition, the semiconductor memory device relating to the present embodiment has the same effects as the semiconductor memory devices in the first to fourth embodiments.

In the present embodiment, the block in the memory portion 140 is divided into two block groups. It may also be divided into three or more block groups with address tables prepared for each.

The present embodiment is an example with split blocks applied to the semiconductor memory device relating to the fourth embodiment. Split blocks may also be applied to a semiconductor memory device relating to the first, second or third embodiment.

What is claimed is:

1. A data storage apparatus comprising:
   a main memory portion divided into a plurality of blocks having a plurality of sectors and storing user data in units of sectors;
   an address information storage portion operative to store address information and to convert a logical block addresses to a physical block addresses of said main memory portion;
   a flag storage portion operative to store flags, said flags being used for differentiating among used blocks, unused blocks that do not contain said user data, and unused blocks that do contain said user data;
   a control circuit operative to convert an externally input logical address to said logical block address and sector address each time said user data is written to said sector, and executing processes (i) to (iii) when said physical block address corresponding to said logical block address is not registered in said address information, and executing processes (iv) to (vi) when said physical block address corresponding to said logical block address is registered in said address information:
   (i) selecting one of said unused blocks using said flag;
   (ii) when said user data are not stored in the selected unused block, writing said user data to the sector corresponding to said sector address located in said selected unused block; and when said user data are stored in said selected unused block, writing said user data to the sector corresponding to said sector address located in said selected unused block, after deleting all data in said selected unused block;
   (iii) registering the physical block address of said selected unused block in the field of said logical block address in said address information, and changing said flag for said selected unused block to a flag indicating a used block;
   (iv) selecting any of said unused blocks using said flag;
   (v) when said user data are not stored in said selected unused block, writing said user data to the sector corresponding to said sector address and located in said selected unused block, then transferring user data in other sectors from said block corresponding to said registered physical block address; when said user data are stored in said selected unused block, deleting all data in said selected unused block, writing said user data to the sector corresponding to said sector address and located in said selected unused block, and copying user data in other sectors from said block corresponding to said registered physical block address; and
   (vi) changing said flag for said block corresponding to said registered physical block address to a flag indicating an unused block wherein said user data are stored; registering the physical block address of said selected unused block in the field of said logical block address of said address table; and changing said flag for said selected unused block to a flag indicating a used block.

2. The data storage apparatus, according to claim 1, comprising a data buffer memory, having a storage capacity of one sector, where said user data written to said main memory portion or said user data read from said main memory portion are temporarily stored.

3. The data storage apparatus, according to claim 1, wherein said address information storage portion comprises an address buffer memory and said control circuit generates said address information within said address buffer memory as part of the process of writing or reading said user data.

4. The data storage apparatus, according to claim 3, wherein said control circuit generates control tables for generating said address information within said address buffer memory.

5. The data storage apparatus, according to claim 4, wherein said control tables include an address search block table indicating said physical block address at which the search for a block assigned to said logical block address begins.

6. The data storage apparatus, according to claim 4, wherein said control tables include a deleted data block table showing the first physical block address of those blocks that do not contain said user data.

7. The data storage apparatus, according to claim 4, wherein said control tables include a not yet assigned logical address block table showing the first physical block address of those unused blocks that contain said user data.

8. The data storage apparatus, according to claim 3, wherein said flag storage portion is stored in regions within said main memory portion.

9. The data storage apparatus, according to claim 8, wherein said main memory portion comprises a control information region, for storing information for generating said address information and said flag, within the block for storing said user data.

10. The data storage apparatus, according to claim 3, wherein said control circuit groups said logical block addresses and said physical block addresses into a plurality of address groups, and generates an address table showing the relationship between the nth logical block address group and the nth physical block address group within said address buffer memory.

11. The data storage apparatus, according to claim 10, when writing or reading to subsequent logical block address groups, said control circuit regenerates said address table corresponding to said other logical block address groups.

12. The data storage apparatus, according to claim 11, her comprising a resident address table for registering the physical block address corresponding to a predetermined logical block address, within said address buffer memory.

13. The data storage apparatus, according to claim 12, wherein said physical block address assigned to said predetermined logical block address is registered in said resident address table, and said physical block address assigned to another logical block address is registered in said address table, when said address table is generated.

14. The data storage apparatus, according to claim 1, wherein said main memory portion has a block for storing said addresses information and said flags; and
   said control circuit reads said address information and said flags from said main memory portion, and stores said address information to said address information storage portion, and stores said flags to said flag storing portion.

15. The data storage apparatus, according to claim 14, wherein said block for storing said address information and said flags is apart from the blocks where said user data are stored.

16. The data storage apparatus, according to claim 14, comprising an address buffer memory for reading from said main memory portion and storing said address information and said flag, while said control circuit reads or writes data.

17. The data storage apparatus, according to claim 1, wherein each of said plurality of blocks has a sector for storing control information which contains assigned logical block addresses and a status that means any of the following: the status wherein the block contains data and is assigned a logical block address; the status wherein the block does not contain data and is not assigned a logical block address; and the status wherein the block does contain data and is not assigned a logical block address; and said control circuit reads said control information from all of said sectors, makes said address information using said control information, and stores said address information to said address information storing portion.

18. The data storage apparatus, according to claim 1, wherein each of said plurality of blocks has a sector for storing control information which contains assigned a logical block address and a status that means any of the following: the status wherein the block contains data and is assigned a logical block address; the status wherein the block does not contain data and is not assigned a logical block address; and the status wherein the block does contain data and is not assigned a logical block address; and said control circuit reads said control information from a part of said sectors, makes said address information using these control information, and stores said address information to said address information storing portion.

19. The data storage apparatus, according to claim 18, wherein said control circuit further reads said control information from said sectors having high frequency of use, makes a resident address information using read control information, and stores said resident address information to a resident address information storing portion.

20. The data storage apparatus, according to claim 1, wherein one or more split blocks, comprising a pair of a pre-move block and post-move block is structured in said memory portion, the same logical block address is assigned to said pre-move block and said post-move block; and wherein user data are written to said post-move block during a write operation.

21. The data storage apparatus, according to claim 20, further comprising a buffer memory for holding split block control tables for managing said split block.

22. The data storage apparatus, according to claim 21, wherein said split block control tables include a split block table indicating the logical block address assigned to said split block.

23. The data storage apparatus, according to claim 21, wherein said split block table comprises a pre-move block table indicating the physical block address of said pre-move block and a post-move block table indicating the physical block address of said post-move block.

24. A data storage apparatus comprising:

an address table storing circuit for storing a relationship between physical block addresses and logical block addresses included in logical address which has said logical block address and a sector address;

a memory circuit divided into a plurality of blocks, each block comprising a plurality of sectors, user data being read and written in said memory circuit in units of said sectors and being deleted from said memory circuit in units of said blocks;

a flag storage circuit for storing flags which are for differentiating among used blocks, unused blocks that do not contain said user data, and unused blocks that do contain said user data;

a control circuit having a function of inputting said logical address and said user data, a function of searching an unused block of said memory circuit, a function of deleting the stored data of said unused block when some user data is stored in said unused block, a function of writing the user data to the sectors which is included in said unused block and is corresponding to the sector address of input logical address, a function of searching the physical block address corresponding to the logical block address of the input logical address and copying the data from the sectors of the block corresponding to the searched physical block address to the sectors of said unused block except the sector corresponding to said input sector address, and, a function of rewriting said searched physical block address of said address table storing circuit to the physical block address of said unused block.

* * * * *